United States Patent
Tomescu

(10) Patent No.: US 6,529,820 B2
(45) Date of Patent: Mar. 4, 2003

(54) SYSTEM AND METHOD FOR DETERMINING THE 3D POSITION OF AIRCRAFT, INDEPENDENTLY ONBOARD AND ON THE GROUND, FOR ANY OPERATION WITHIN A "GATE-TO-GATE" CONCEPT

(76) Inventor: Ion Tomescu, Sos. Bucuresti-Ploiesti 36-40, BI II/2, Ap. 31, CP 18-71, Bucharest, Sector 1, Code 71562 (RO)

(*) Notice: Subject to any disclaimer, the term of this patent is extended or adjusted under 35 U.S.C. 154(b) by 0 days.

(21) Appl. No.: 09/832,234

(22) Filed: Apr. 10, 2001

(65) Prior Publication Data

US 2002/0147542 A1 Oct. 10, 2002

(51) Int. Cl.$^7$ .................. G06F 19/00; G01S 3/02; G01S 5/14
(52) U.S. Cl. ........................... 701/120; 342/36
(58) Field of Search ............... 701/120, 16, 17; 342/36, 450, 451, 463; 340/961

(56) References Cited

U.S. PATENT DOCUMENTS

| | | | | |
|---|---|---|---|---|
| 3,623,090 A | * | 11/1971 | Gilbert et al. | 342/29 |
| 3,659,085 A | * | 4/1972 | Potter et al. | 342/451 |
| 4,197,538 A | * | 4/1980 | Stocker | 342/32 |
| 4,232,313 A | * | 11/1980 | Fleishman | 342/32 |
| 4,454,510 A | * | 6/1984 | Crow | 342/32 |
| 5,548,515 A | * | 8/1996 | Pilley et al. | 340/961 |
| 6,366,240 B1 | * | 4/2002 | Timothy et al. | 342/417 |

FOREIGN PATENT DOCUMENTS

| | | | |
|---|---|---|---|
| JP | 08015405 A | * | 1/1996 |
| WO | WO 9503598 | * | 2/1995 |

OTHER PUBLICATIONS

*Air Traffic Management Strategy for 2000+*, vol. 1, Eurocontrol, Nov. 1998.
*Air Traffic Management Strategy for 2000+*, vol. 2, Eurocontrol, Nov. 1998.

* cited by examiner

Primary Examiner—Michael J. Zanelli
(74) Attorney, Agent, or Firm—Carella, Byrne, Bain, Gilfillan, Cecchi, et al.; John N. Bain; William Squire

(57) ABSTRACT

A system and method for determining simultaneously and independently onboard of each aircraft and on the ground at ATC centers utilizing substantially identical surveillance modules for determining the 3D position of all aircraft in an ATC area utilizing a UTC clock to further synchronize all of the surveillance modules on the aircraft and at ground stations. Five ground stations including a master and four slaves communicate with each other and all aircraft in the ATC areas. The same precise 3D position of all aircraft operating in that ATC airspace is simultaneously computed by all the aircraft in that ATC area utilizing the measured distance between the aircraft and ground stations in that area providing full automated support for landing, take-off and taxi operation of the aircraft to a Gate or from a Gate, by using a ground infrastructure of radio communication stations which are operating worldwide within a 16 MHZ frequency spectrum from the existing DME 962–1213 MHZ spectrum. During functioning of the system, any mobile equipped with a dedicated receiver could determine its 2D position on the ground within an airport area or within any ATC area, such mobile being a truck, a car, a boat, a train, a mobile phone, or any other mobile operating in that ATC area and tuned on the frequency of operation of that ATC area.

47 Claims, 8 Drawing Sheets

SYSTEM AND METHOD FOR DETERMINING THE 3D POSITION OF AIRCRAFT, INDEPENDENTLY ONBOARD AND ON THE GROUND, FOR ANY OPERATION WITHIN A "GATE-TO-GATE" CONCEPT

BACKGROUND OF THE INVENTION

1. Field of the Invention

This invention relates to the measurement and display of the altitude, longitude and latitude (hereinafter "3D") position of aircraft at any time while in flight, on the ground, during take-off or during landing within gate-to-gate.

2. Description of the Prior Art

At present, the 3D position of aircraft is determined onboard the aircraft using GPS or Inertial Navigation System (INS) with altimeters or OMEGA (LORAN) with altimeters or VOR (radial position to known ground station position) (TACAN)/DME (distance measuring equipment) with altimeters. INS is independent of the ground systems measuring the movement of the aircraft in flight and is used in conjunction with DME to measure the aircraft distance to certain ground positions. The 3D position of an aircraft is also determined by ground stations using primary 3D radars (which use reflective signals to provide a conventional "return" signal or "blip" on a radar screen) which provide 2D position (These radars do not use transponders and do not provide altitude.) and by secondary radars (MSSR) which utilize an aircraft identification code and the altitude received from the in flight aircraft transponder. The problem with the aircraft and ground based systems is that they are not synchronized and therefore may not manifest the same data. The 3D position determined by the aircraft in flight is determined by different equipment than the 3D position determined by a ground station. The aircraft in flight determined position therefore is not the same as the position as determined by the ground station(s). If the aircraft pilot desires to know the 3D position of his aircraft as determined by the ground station, the ground station must communicate this via a communication channel on request of the aircraft. More importantly, each aircraft in flight or on the ground has no direct information about any other aircraft in its vicinity. This information may be obtained in present day systems only by communication between pilots and the ground stations. Collision avoidance systems do not provide the 3D position of other aircraft, but only provide a warning to the pilot of a given aircraft to take some evasive action to avoid another aircraft in its vicinity.

GPS positioning, while more accurate than a ground positioning system, is not used as a primary system on in-flight aircraft since it is not considered reliable as a primary positioning system due to many factors. Such factors include weakness of the signals (the satellites are 11,000 miles from earth), interference by atmospheric conditions, and the fact that the GPS receiver could be jammed intentionally or unintentionally at any time. GPS is not approved as a primary system for determining aircraft position.

In a still further aspect, a minimum of four ground stations including a ground master station is included with the remaining stations forming slave stations, each station and aircraft having a unique ID code, each station and aircraft including transmitter/receiver means for communicating with each other a plurality of information signals, each signal from a ground station including the ground station ID code and each aircraft signal including an aircraft ID code, said calculating means for calculating the distances based on the transmission delays of said information signals to and from the aircraft and ground stations, a portion of said signals including said calculated distances.

The main disadvantage of the existing ATC system is due to its internal infrastructure which can not be integrated in a unique virtual system in aircraft and on the ground due to the use of too many systems based on different technologies. These technologies, due to their differences, perform the calculation of the aircraft's 3D position, using an excessively large frequency spectrum and leave little frequency spectrum space for voice/data communication channels between aircraft and between aircraft and air traffic control centers. This is considered by the present inventor to constitute a significant disadvantage of the present systems among others. The present inventor recognizes a demand by travelers onboard aircraft for use of frequency spectrum for business and personal purposes. Such spectrum is presently not available due to the primary use of the different present 3D positioning technologies which take up the available frequency spectrum.

A reliable GPS positioning determining system with INS and appropriate communication means between aircraft and between aircraft and ATC centers could replace all other systems and leave enough frequency spectrums for today and future communication needs.

In order to obtain a reliable GPS that could be approved as primary navigation system onboard of each aircraft, the US FAA developed a WAAS/LAAS concept using satellites which should cover the needs of future integrated Air Traffic Management (ATM) System as defined by the AIR TRAFFIC STRATEGY FOR 2000+document, adopted by ICAO published by Eurocontrol, November 1998. Such a system would use a low orbit satellite system in conjunction with a local airport station (LAAS), local augmented Area Satellite forming a new primary system. Until such concept will prove its performances and which is subject to development into real world hardware, the need exists for determining simultaneously and independently of each other, the synchronized and precise 3D position of each aircraft onboard each aircraft and the same 3D position of all aircraft in the airspace dedicated to an ATC center, to be determined by each aircraft and by that ATC system. Without such performances, any future ATM system (air traffic management system) can not comprise a truly integrated synchronized system. Consequently, the ATM system capacity is still limited and will generate delays and high costs for operation.

Present air traffic control systems utilize flight planning and preassigned routes. This limits the amount of air traffic in a given space and is also wasteful because it is not based on the shortest route between departure and arrival destinations, but on the availability of the prearranged air routes or "highways." It is recognized in the AIR TRAFFIC STRATEGY FOR 2000+document that freer flight paths not restricted to prearranged routes will increase the availability of space for additional aircraft. But implementation of such concepts awaits future development of the necessary technologies. There is an urgent need for solutions to the present air traffic control systems which is saturated and at its limit for air traffic capacity. To increase capacity, steps are being taken to decrease aircraft spacing, for example, during take off and landing and in holding patterns. This is not a viable long tern solution to the problem of a need to more efficiently utilized the available space and frequency spectrum allotted to air traffic control.

SUMMARY OF THE INVENTION

A need is recognized by the present inventor for a system which can compute onboard each aircraft its actual 3D position and simultaneously and independently of any other 3D computing system, compute the 3D position of each aircraft in conjunction with the appropriate Air Traffic Control (ATC) center responsible for that airspace which may be for a given airport, an Area Control Center (ACC), e.g., a 300 mile radius, which controls the area and airspace about the airport, an Approach Area (APP), i.e., the runway (s) area or an airport tower (TWR) which controls the local air space at the airport. The same need is applicable to any area where overall mobile ground station positions are controlled.

The aforementioned needs are provided according to the present invention which provides a precise 3D position calculation onboard of each aircraft and simultaneously and independently of the aircraft calculation, provides the same synchronized 3D position calculation on the ground at each ATC center location.

A surveillance system for air traffic control in selected ATC areas according to the present invention comprises first means for independently and simultaneously determining the 3D location in flight and on the ground of all active aircraft in the selected aircraft ATC area; and second means onboard each aircraft for indicating the determined 3D locations of all said active aircraft.

In one aspect, the first means comprises a plurality of ground stations corresponding to each said selected area, each said ground station including a first surveillance module for determining the 3D position of all associated aircraft in said selected area.

In a further aspect, the first surveillance modules in each of the ground stations are identical and further including a second surveillance module in each of the aircraft identical to the ground station modules, each first and second modules including calculating means for calculating the 3D position of all said aircraft based on the measured distance between each aircraft and each ground station.

In a further aspect, the first and second surveillance modules each include 3D position calculating means for calculating the distance between each aircraft and each ground station.

In a further aspect, means are included for synchronizing each calculating means of each module with each other.

In a still further aspect, a minimum of four ground stations including a ground master station is included with the remaining stations forming slave stations, each station and aircraft having a unique code, each station and aircraft including transmitter/receiver means for communicating with each other a plurality of information signals, each signal from a ground station including the ground station ID code and each aircraft signal including an aircraft ID code, said calculating means for calculating the distances based on the transmission delays of said information signals to and from the aircraft and ground stations, a portion of said signals including said calculated distances.

In a further aspect, the first means comprises a plurality of ground stations corresponding to each selected area, each ground station including a first surveillance module for determining the 3D position of all associated aircraft in the selected area.

In a further aspect, the surveillance modules in the ground stations are identical and further including second identical surveillance modules in all of the aircraft, each first and second modules for calculating the 3D position of the associated aircraft for each the second modules.

In a further aspect, the first and second surveillance modules each include 3D position calculating means and a clock and means for synchronizing each calculating means of each module with the clock signal of each other.

In a still further aspect, a system and method is provided for determining, substantially simultaneously and independently of each other, onboard aircraft and on the ground, a synchronized 3D position of all aircraft in an air traffic control area from gate-to-gate.

In a further aspect, the system comprises a plurality of identical ground radio-communication and 3D position determining stations located in each air traffic control area forming a group of ground stations, each group being assigned an ATC area such as ACC, APP and TWR area and for each runway within a TWR area.

In a further aspect, the above arrangement of stations may be provided to any area such as a town, a port or other predefined region.

In a further aspect, each group of ground stations operates at the same frequency and range. For each group, one station is a master and all other ground stations associated with the master station are slave stations. Each ground station includes a GPS receiver and a surveillance module.

In a further aspect, a surveillance module is provided each aircraft and ground station and comprises microproccessor means and dedicated precise oscillator means using DDS-Driven PLL (phase lock loop). In each ground station, a GPS receiver is included with the surveillance module and monitors and validates the ground station calculated 3D position and delivers an accurate reference UTC clock for a period as long as the 3D position provided by GPS is identical with the known geographical coordinates of that ground station (within accuracy of +/−10 meters and clock accuracy within 20 ns (rms) to the UTC.

In a further aspect, the location of all ground stations and their geographical 3D coordinates, assigned unique ID codes, frequency of operation, range and distances between each other are known and are provided to the aircraft operators by a worldwide navigation database.

According to a further aspect, to compute the aircraft 3D position, the aircraft onboard system measures the distance value between the aircraft and all ground stations with their known 3D geographical coordinates. At the same time, the onboard system utilizes the same distance values measured by the ground stations and provided by an ID coded signal thereto from each ground station, between each ground station and the aircraft and such signals are transmitted to the aircraft for determining the aircraft 3D position. The on ground ATC 3D determining system for each ground station in a group of stations associated with a master station includes means for computing independently of each other the 3D position of each aircraft associated with that group of ground stations based on distance values, measured on the ground, between each ground station of the group of ground stations and each aircraft and the known geographical 3D coordinates of the ground stations of the given group of ground stations. group of ground station and aircraft and the known geographical 3D coordinates of the ground stations of the given group of ground stations.

In a further aspect, each master ground station surveillance module generates a surveillance cycle signal and includes means responsive to the surveillance cycle signal for computing an aircraft 3D position for each aircraft, displaying that computed 3D position and for repeating the generation of such cycle signals computation of 3D positions for each aircraft in the airspace allocated to a given ATC center.

In a further aspect, means are provided wherein the master station of each group of stations selects, one by one, at the beginning of a surveillance cycle, each aircraft in the ATC area associated with that master station and group of stations for computing the 3D position of that selected aircraft. Means are included in each master station to receive the ID code of each aircraft in the associated airspace provided by an ATM database.

In a further aspect, a surveillance cycle comprises a plurality of signals generated by the master ground station and contains a defined number of steps wherein a dedicated radio communication signal is transmitted by the master station to a selected receiver and that selected receiver then transmits to the master station a dedicated radio communication signal. The dedicated radio communication signal contains a type ID code associated with that signal, the ID code of the selected receiver, specific data associated with the selected receiver and the ID code of the transmitter. The selected receiver may be an aircraft or a slave ground station.

In a further aspect, the surveillance cycle starts with a first step in which the master ground station interrogates the selected aircraft with an interrogation signal S1. The selected aircraft responds to the interrogation signal with a first response signal S2 which includes the aircraft ID code and altitude and transmits that S2 signal to that master station. At the end of this step, the master ground station then determines the distance value to the selected aircraft by measuring the time delay between the moment of transmission of signal S1 and the moment of receiving the radio communication signal S2 from the selected aircraft and also is advised of the altitude of the aircraft via the response S2 signal from the aircraft. During these determinations of distance values, the determinations onboard the aircraft and at each ground station are assigned a fixed time period T1 for making such determinations, which time period is the same for all aircraft and ground stations. The time delay T1 is subtracted from the measured time delays in a given sequence.

In a next second step, the master ground station transmits a third signal to the same selected aircraft a different radio communication signal S3 containing the determined distance value between the master station and selected aircraft as measured on the ground. The selected aircraft receives the communication signal S3, and computes onboard the aircraft the distance value to the master ground station based on the time delay between the moments of transmitting to and receiving from master station of its radio communication signals, less the predetermined time period T1, and transmits to the master ground station a further radio communication signal S4 containing the distance value between the selected aircraft and master station, computed onboard that selected aircraft. At the end of the second step, all ground stations and all of the aircraft in that ATC airspace now know the distance value between the master station and selected aircraft, as measured on the ground since they all are in the range of the transmitted ground station and air and receive such signals. They all also receive the signals manifesting the same distance value measured onboard of the selected aircraft together with the altitude of selected the aircraft.

With this distance value, all slave stations then compute the distance value between the respective slave station and the selected aircraft by measuring the time delay between the moments of receiving the radio communication signals transmitted by master ground station and the selected aircraft, less the time period T1 which is the same for all aircraft. This measured time delay value is manifested by the unknown distance between the master station and selected aircraft, by the known distance between the master station and that slave station and by the unknown distance between the selected aircraft and that slave station. Immediately after the master station computes and transmits the distance value to the selected aircraft, each slave station then computes the remaining unknown distance value between the selected aircraft and that slave station.

At this moment in time, all ground stations now have the distance values to the selected aircraft, measured on ground, and the distance value between the selected aircraft and master station, measured onboard of selected aircraft. In the same time period, the selected aircraft has onboard the distance value to the master station, measured on ground and onboard that aircraft.

In a further aspect, to compute the 3D position of the selected aircraft, the ATC ground system needs the distance values to the selected aircraft from the master station and each of the slave stations. At the same time, the selected aircraft needs, for onboard 3D position calculations, the distance values to each slave ground station. To fulfill both needs, the master ground station interrogates, one by one, each slave station. When such interrogation radio communication signals are received, each slave station responds to the master station with a dedicated radio communication signal containing the ID code of selected aircraft and the distance value to selected aircraft, measured by that slave station. At the end of this process, all aircraft including the selected aircraft, and on the ground in the ATC system, know all of the distance values, measured on ground, between each ground station and selected aircraft.

In a further aspect, during the process of interrogation of slave ground stations, by the master station, the selected aircraft receives all of these transmitted radio signals from the master station and each slave station. Using the same procedure, the selected aircraft computes onboard the distance value to each slave station by measuring the time delay between the moments of receiving the interrogation signal transmitted by master station and responding signal transmitted by each slave station, less the time period T1, knowing the distance value to the master ground station.

In a further aspect, the selected aircraft has the distance values to each ground station, measured on the ground and onboard. Based on the determined distance values and known position of each of ground station, the selected aircraft computes onboard its 3D position. At the same time, the on ground ATC system computes the selected aircraft 3D position.

In a further aspect, during the interrogation process of all slave stations, by the master ground station, every aircraft in the ATC airspace includes means to employ the same procedure for measuring the time delay between the receiving moments of radio communication signals from the master station and each slave station. To compute the distance value between each aircraft and each slave station, each aircraft needs to know the distance value to the master ground station. To fulfill these needs, the master ground station includes means to transmit, at the end of the surveillance cycle, a dedicated radio communication signal containing a master station ID code and a UTC clock value, measured in milliseconds, microseconds, nanoseconds within the last UTC clock second, at the time of the start of the transmission of the later dedicated radio signal.

Thus a procedure is used by each aircraft and by the ground stations before the acceptance to the ATM database of the 3D aircraft determined position, wherein the onboard UTC clock being previously synchronized with the master ground station UTC clock, the distance value to the master ground station as computed onboard of each aircraft is based on the time delay values for the various signals between the ground stations and the aircraft until each aircraft receives the final dedicated radio communication signal from the master ground station.

Thus, also, at the moment in time of receipt of the final dedicated signal, all aircraft, in that ATC airspace, know precisely the 3D position of the selected aircraft and their own 3D position. At the same time, the UTC clock of all slave ground stations and selected aircraft are precisely synchronized with master station UTC clock, using the dedicated radio communication signal from the master station and having previously measured the distance value to the master station.

In a further aspect, the ground stations check and adjust, if needed, their respective precise oscillator frequency, used for distance measurements, by employing the difference between the known geographical distances between the ground stations and the same values measured by each ground station using their precise oscillator.

In a still further aspect, the selected aircraft use the same procedure as the ground stations to check and adjust its precise oscillator, used for distance measurements, by comparing the distance values to each ground station, as measured onboard and as measured at the ground stations. The distance values measured by the ground stations are used as the reference values to adjust the aircraft precise oscillator.

In a further aspect, the above procedure is repeated for each aircraft located in that ATC airspace based on their ID code provided by the ATM database. At the end of the surveillance process, an aircraft list is provided by ATM database, each aircraft in that ATC airspace passing through "the selected aircraft" position status and, thus, all aircraft 3D positions are available, in the same time period, onboard each aircraft and on the ground at the ground stations corresponding to that ATC system location at that ATC system location.

Preferably, a complete surveillance process, including providing the 3D positions to all aircraft operating in one ATC airspace, is less than 10 seconds for an ACC area, and less than 4 seconds for an APP/TWR area.

Based on the above, the capacity of the ATC control system, in accordance with the present invention, to control and monitor the 3D position of any aircraft operating in one ATC airspace is believed to be practically unlimited and consequently believed to cover future traffic demands.

In a further aspect, a method of determining the 3D position of all active aircraft in a given ATC area comprises independently computing on board each aircraft the 3D position of all of aircraft in a given time period and selectively displaying the computed 3D positions.

In a further aspect, the independently computing step comprises transmitting signals between each said active aircraft and each of a plurality of ground stations, measuring the transmission time delay of certain of the signals and computing from the time delays the distances between each aircraft and said ground stations and between selected ground stations to each other.

In a further aspect, the ground stations comprise a master station and a plurality of slave stations, the transmission of signals including transmitting a first set of signals between the master station and a selected aircraft of the plurality of aircraft and then transmitting a second set of signals between the master station and each said slave station, a first set of said signals for use in said measuring step and a second set of said signals for transmitting the measured distances to and from the selected aircraft and the master station and a third set of signals for transmitting the measured distances to and from the master station and each said ground station to form a surveillance cycle.

BRIEF DESCRIPTION OF THE DRAWING

These and other features and objects of the present invention will become apparent upon reading the following description with reference to the accompanying drawings in which.

DETAILED DESCRIPTION OF A PREFERRED EMBODIMENT

DEFINITIONS

These are well known and are defined by ICASO standards used in Air Traffic Control.
ACC—Air Control Center
ACTIVE AIRCRAFT—An aircraft whose engines are on.
APP—Approach area
ATM—Air traffic management system
ATC—An air traffic control center for an area which may be an ACC, APP, TWR.
CV-A UTC clock value at time CV.
2D Position—Position based on latitude and longitude on the earth.
30 Position—The position based on longitude, latitude and altitude above a fixed land based reference such as at sea level.
DOS—Digital Driven Synthesizer
DME—Distance Measuring Equipment system
GATE-TO-GATE—The moment an aircraft user first interacts with the ATM and ends with the switch-off of the aircraft engines, including also the processes which encompass the charging of the user for ATM services. This does not encompass ATM processes only.

Figure 5:
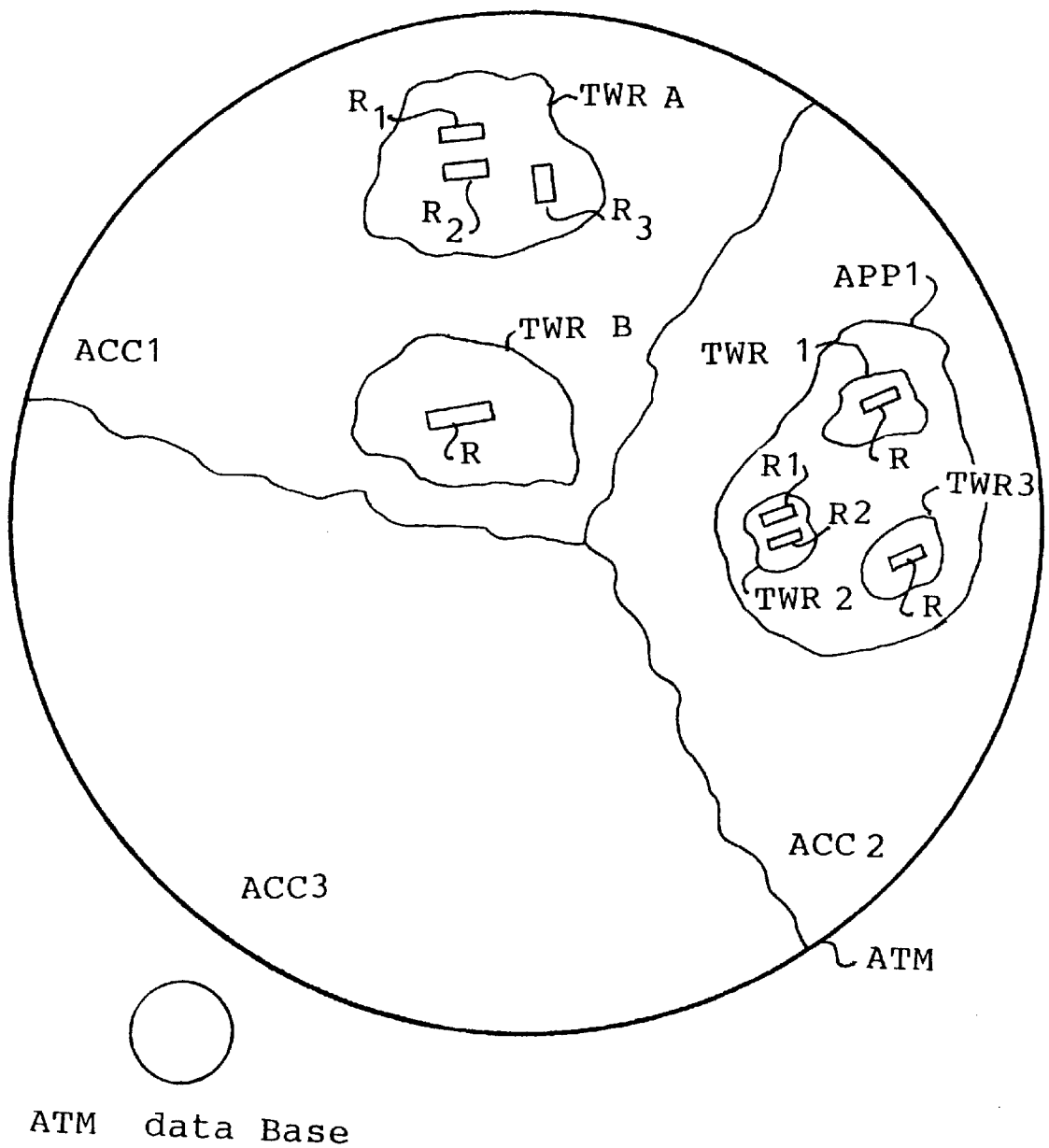
FIG. 5 illustrates schematically a representative an Air Traffic Management (ATM) area.

GPS—Global satellite positioning system.
GROUND STATION-Fixed or movable communications station located on the earth/water for communication between other ground stations or aircraft. May include a GPS receiver and/or other means for determining 3D position.
ICAO—International Civil Aviation Organization
ILS—Instrument Landing System
INS—Inertial navigation system.
INTEGRATED—Systems or procedures which are, or which appear to the end user to function as a single entity.
LAAS—Local Augmented Area Satellite
LORAN
MSSR—Monopulse Secondary Surveillance Radar
NAV—Navigation system. This system onboard an aircraft utilizes the output of the surveillance module to determine vectors for other aircraft automatically.
OMEGA—A commercial system.
PRIMARY RADAR—A radar that locates an object by 3D position without altitude data. No transponders are used and uses only reflected signals.
SECONDARY RADAR—An MSSR system that uses interrogation signals to received ID coded signals manifesting altitude and 2D position of an aircraft.
SURVEILLANCE CYCLE—This is the time period in which a Surveillance Module calculates a 3D position signal of a selected aircraft.
SURVEILLANCE MODULE—This is an electronic system for calculating its 3D position independently of other 3D position determining systems and generates an output signal manifesting such a calculated 3D position.,
SURVEILLANCE PROCESS—This is the process by which a Surveillance System calculates the 3D position of all aircraft and ground stations in an ACC, APP or TWR area somewhere in a gate-to-gate region.
SURVEILLANCE SYSTEM—A system for determining the 3D position of each aircraft in an ACC, APP or TWR area using a Surveillance Process.
TACAN
TWR—Tower control area in an airport which area is under the control of the airport control tower and typically located within a 10 mile radius. A tower control area includes any number of runways within the control of that tower.
UTC—Universal Time Coordinated clock
VALIDATION—Confirmation by examination and provision of objective evidence that the particular requirements for a specific intended use are fulfilled
VERIFICATION—Confirmation by examination of evidence that a product, process or service fulfills specified requirements.
VOR
WAAS—Wide Augmented Area Satellite In FIG. 5, an air traffic management system ATM is a system that encompasses the entire region of the contiguous 50 states of the US for example. Air traffic is controlled continuously in the ATM system with no breaks. The ATM comprises a plurality of subsystems referred to as Air Traffic Control areas, which may include area control centers ACC1, ACC2, ACC3, for example. Each ACC area comprises one or more subsystems of air traffic control referred to as APP, TWR or runways. An APP area can include a plurality of TWRs. An ACC area ACC2, for example, the New York City region of the US comprises JFK, Laguardia, and Newark airports which together form an APP area APP1. Each airport is referred to as a tower (TWR) such as TWR1, TWR2 and TWR3 in FIG. 5. Each TWR area includes one or more runways R. TWR1 and TWR2 each are shown with a single runway R and TWR2 area is shown with two runways R1 and R2. ACC3 is shown having no TWR as might occur over large regions of the US which have no closely associated airports. In the alternative, each ACC area may also be referred to as an ATC area.

Figure 1:
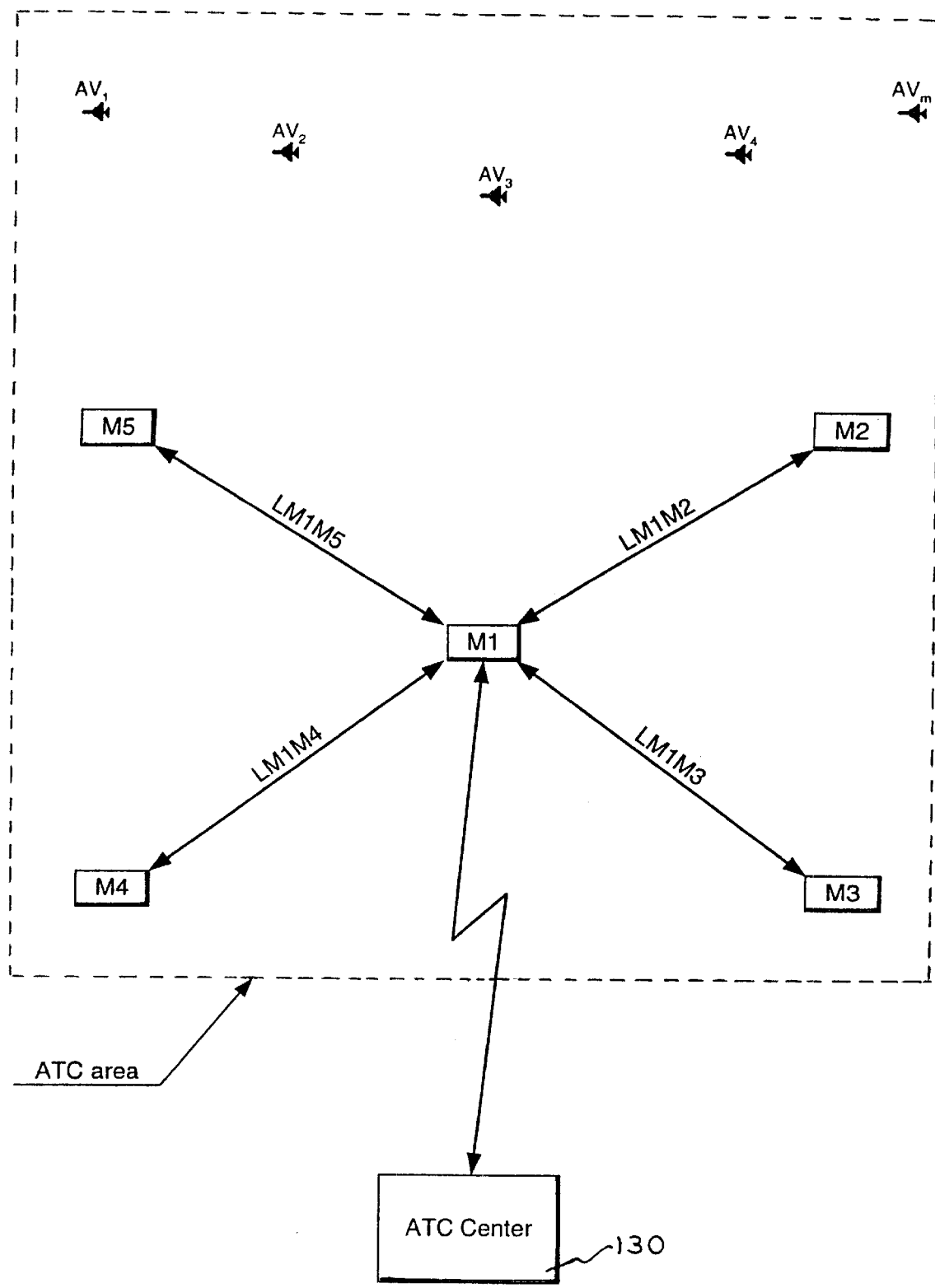
FIG. 1 is a pictorial representation of a group of five ground radio-communication stations allocated to an ATC area and in conjunction with an arbitrary number of aircraft in that ATC airspace for illustrative purposes in accordance with an embodiment of the present invention.
Figure 2:
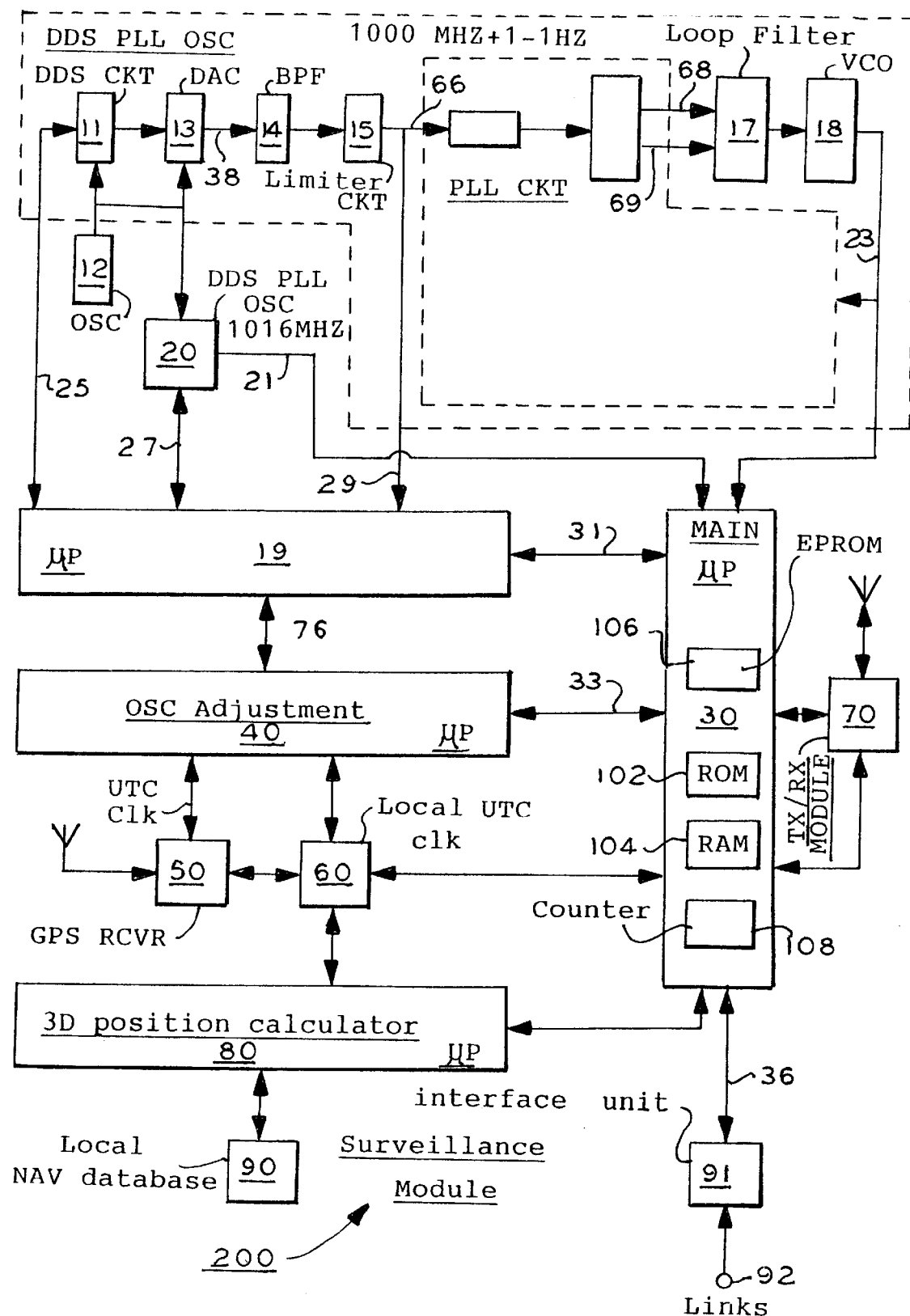
FIG. 2 is a block diagram of a representative surveillance module of the ATC system according to an embodiment of the present invention used onboard of all aircraft and on ground by all ground stations.

In FIG. 1, a plurality of aircraft depicted as Av1, Av2, AV3, AV4, and Avm, carry onboard a surveillance module 200, FIG. 2, according to the present invention. The aircraft are pictorial illustrated as being on the ground or in flight within the airspace allocated to an ATC area, for example, ACC1, FIG. 5. The ACC1 area has a plurality of ground stations M1, M2, M3, M4, M5 lying within that area. One of the ground stations M1 is a master station and all other four stations M2–M5 are slave stations. The number of ground stations is selected to be five wherein three are used to compute 3D calculations and two are used for a validation procedure as described later.

Figure 6:
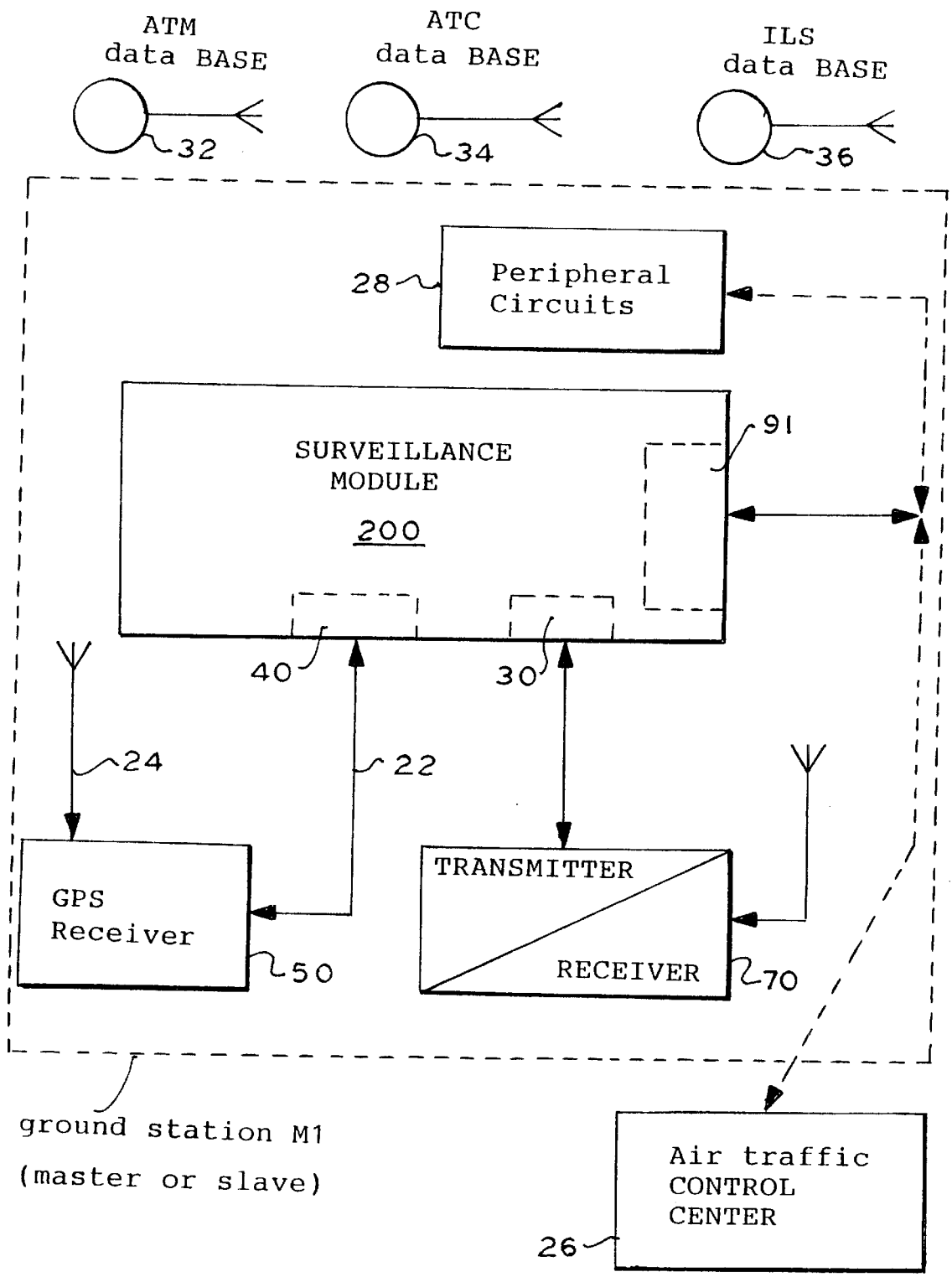
FIG. 6 illustrates schematically a representative area control center (ACC) of FIG. 5.

For each ATC area there is allocated a group of five of the ground stations, M1–M5, each of which includes a radio transmitter/receiver 70, FIG. 6, having the same frequency of operation and range. In FIG. 6, representative ground station M1 is shown it being understood the other stations M2–M5 are identical.

Master station M1 comprises a surveillance module 200 which will be described later in connection with FIG. 2. The surveillance module generates the ID code of the master station M1 which defines its longitude, latitude, and altitude with respect to a reference, such as sea level, already known onboard of the aircraft based on its updated navigation database. For that geographic area, the land altitude will have a certain value relative to the reference value. All aircraft avionics (not shown) also use the same reference values and from the ATM data base know the land altitude for that station. Thus an aircraft via its avionics can determine its actual altitude from the land based master station. The station M1 includes a GPS receiver 50 which receives, computes and transmits data as to the 3D position of the station M1 in a known manner to the surveillance module 200 at a microprocessor 40 input via line 22. The GPS data is used for the computation and validation of the M1 station 3D position, already existing in the worldwide navigation database, based on satellite inputs via antenna 24. The module 200 also includes a main microprocessor 30 whose function will also be described later which sends and receives signals to the station M1 transmitter/receiver 70. The surveillance module also includes a communication links 91 which receives and communicates with the Air traffic control center 26 for that region information such as the determined 3D position as discussed below for that station. The links 91 also communicate with peripheral circuits 28 such as displays, computers (PCs), and so on. The communication links also communicate with the various data bases such as the ATM data base 32, the ATC data base 34 and where appropriate, the instrument landing system (ILS) data base 36.

In FIG. 2, representative surveillance module 200 includes a precise DDS-Driven PLL oscillator 10 with an output frequency of 1000 MHZ+/−1 HZ, used for local UTC clock generation, and a precise DDS-Driven PLL oscillator 20 with an output of 1016 MHZ used for distance measurements of one pulse/foot. A main microprocessor 30 has an input from the oscillator 20 output 21 and a second input at line 23 and includes associated electronic circuitry for operating the module 200 in accordance with its dedicated algorithm. The microprocessor 30 includes at least one ROM 102, at least one EPROM 106, at least one RAM 104 and at least one counter 108. The microprocessor 30 is programmed to operate as described below. A dedicated microprocessor 19 has similar components as in the microprocessor 30 and has an input/output at line 25 to oscillator 10 and on line 27 to oscillator 20 and an input at line 29 from the oscillator 10 from the oscillator 10 output of limiter circuit 15. Microprocessor 19 operates the DDS-Driven PLL oscillator 10 in accordance with the DDS-Driven PLL oscillator 10 circuits manufacturer specifications.

Microprocessor 40 calculates the necessary adjustments to the DDS-Driven PLL oscillator 10 and 20 respective frequencies of 1000 MHZ+/−1 HZ and 1016 MHZ. Also included is a GPS receiver 50 for providing an accurate 3D validation position to the ground stations M1–M5 and also provides the same ground stations a precise UTC clock reference. A local UTC clock 60 provides continuously a UTC clock signal in nanoseconds using the 1000 MHZ+/−1 HZ output from the DDS-Driven PLL oscillator 10. A transmitter/receiver TX/RX module 70 provides the radio link for connection with the other ground stations M1–M5 and aircraft using one frequency value in the range of F1 . . . F16. Further included is a microprocessor 80 for performing the 3D position calculations of the associated aircraft based on the distance values calculated by and provided by main processor 30. A local navigation database 90 provides geographical 3D coordinates of the selected group of ground stations M1–M5, their ID code, frequency of operation, range, ground distances between them and generates an updated database for all aircraft in an ATC airspace containing the aircraft ID codes and 3D positions. An interface unit 91 is connected to microprocessor 30 via line 36 and provides the appropriate links 92 of the module 200 to other onboard systems of the aircraft or to the on ground ATC system.

The hardware configuration of the surveillance module 200 is identical for use onboard of any aircraft and on the ground of any ground station. The onboard module does not use a GPS receiver. The software (not shown) used by the surveillance module 200 is specific for aircraft onboard operation, or for on ground operation in the master ground station or slave station. In the claims, the term identical surveillance module refers to the hardware and not to the specific installed software which is different for onboard modules and on ground station modules.

The DDS-Driven PLL oscillator 10 employs a DDS circuit 11, which may be a QUALCOMM 1/2Q2368, and a Digital to Analog Converter (DAC) 13 both driven by a Rubidium oscillator 12 with its frequency of 50.255055 MHZ; wherein any crystal oscillator with the same frequency and similar performances may be used. At the output 38 of DAC 13 is generated a signal with a frequency of 10 MHZ+/−0.011 HZ. This signal is passed through a narrow Band Pass Filter 14 with a bandwidth of 10 MHZ+/−1 KHZ and through a Hard Limiter circuit 15 whose output 66 is applied to PLL circuit 16, which may be a QUALCOMM Q3236PLL available from Qualcomm corporation, with a fixed multiplication factor of one hundred. The circuit details of circuit 16 are available from Qualcomm corporation and are conventional as provided by Qualcomm.

The outputs on lines 68, 69 from the PLL circuit 16 are applied to loop filter 17 and to a Voltage Controlled Oscillator 18 (VCO) which generates at its output line 23 a signal with a frequency of 1000 MHZ+/−1 HZ. Due to the use of a fixed multiplication factor of one hundred and a highly stable oscillator 12, the output signal frequency of 1000 MHZ on line 23 is extremely stable. The output signal of 1000 MHZ(1 ns) is applied to the microprocessor 30 on line 23 to provide a reference timing for the local UTC clock 60. Any frequency deviation from the fixed value of 1000 MHZ will be detected during UTC synchronization procedures between surveillance modules 200, 200' and any adjustments to be made are computed by the microprocessor 40 and transmitted to the dedicated microprocessor 19 on line 76 which will adjust accordingly the output of DDS circuit 11 to keep the output signal of DAC 13 on line 38 at a fixed value of 10 MHZ+/−0.011 HZ and, consequently, the 1 GHZ signal at a value of 1000 MHZ+/−1 HZ. The output signal of the oscillator 20 at 1016 MHZ (which manifests one foot/pulse) is used for the distance measurements and its frequency is automatically adjusted to compensate for any variable factors such as time delays generated by aircraft onboard and on ground equipment during the transmission and receiving process, any radio signal speed deviation from the reference value of 0.98 feet/ns, generated within that ATC airspace between the ground stations and the selected aircraft or by frequency deviation of oscillator 12 from its default value of 50 MHZ.

Figure 7:
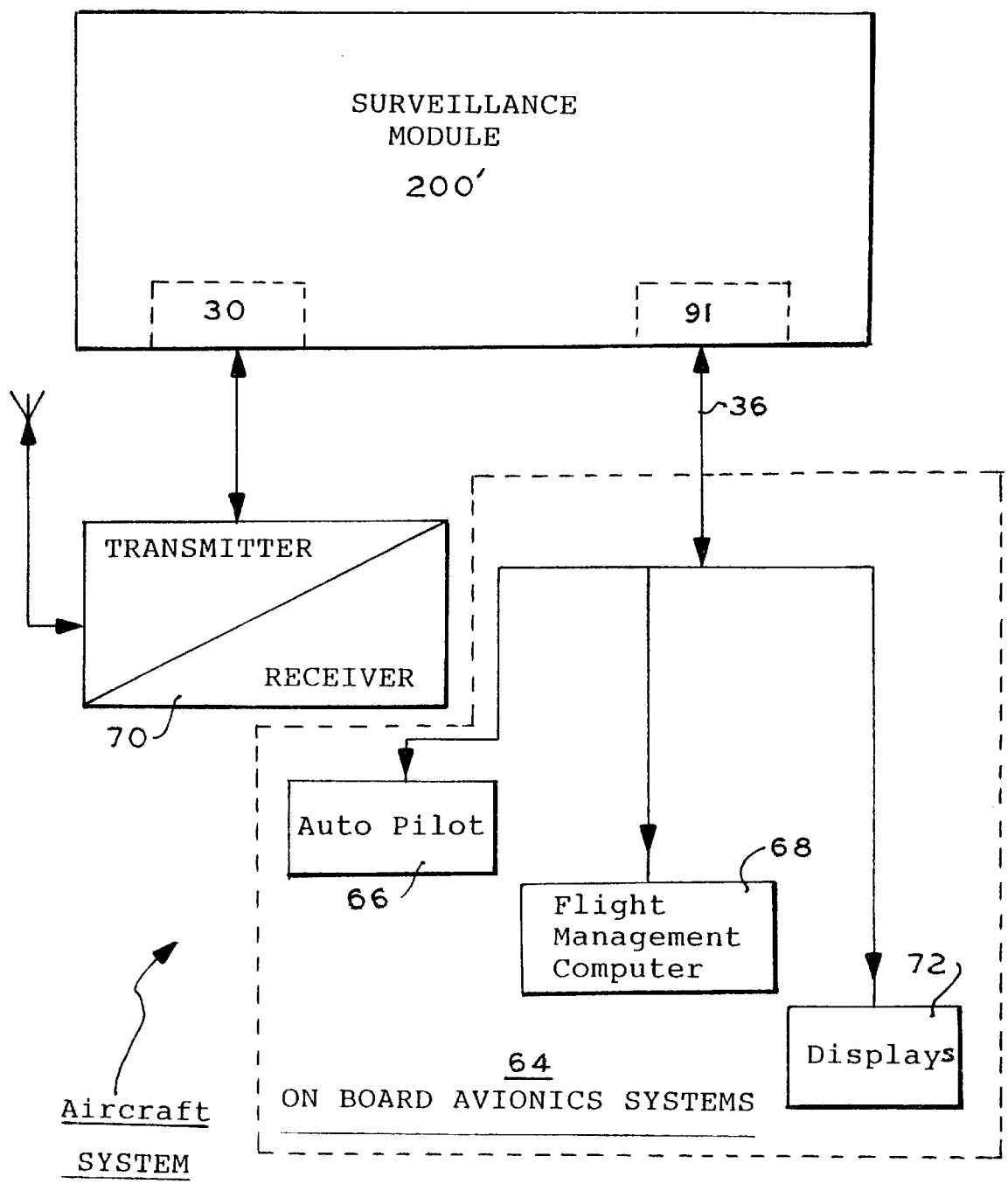
FIG. 7 is a schematic block diagram of a system according to an embodiment of the present invention.

In FIG. 7, the aircraft 3D determining system for each aircraft comprises a surveillance module 200', otherwise the same as module 200 but without the GPS receiver and operated by specific software programs that differ from the station modules 200 programs. The module 200' for the aircraft calculates the 3D position of that aircraft and communicates this information to links 91 via interface unit 91 at line 36. The links 91 communicate over line 36 with various onboard avionics 64 (FIG. 7) the output of module 200' a signal manifesting the determined calculated 3D positions determined by microprocessor 80, FIG. 2 and as described later. It should be understood that various communication lines and signal lines shown as single lines represent busses, a plurality of lines or a plurality of communication media such as fiber optics, land conductive wire lines, radio, microwave and so on as applicable for a given implementation and application. The avionics systems 64 may include an autopilot 66, a flight management computer 68 and various dedicated displays 72. The module 200' main microprocesser 30 receives and communicates with transmitter receiver 70 at the appropriate input/outputs of microprocessor 30.

All of the ground stations M2–M5 are identical and include a module 200.

The location of master ground station M1 is selected such that any radio signals transmitted by this station will be received by all other slave stations M2–M5 and vice versa. There is a direct ground communication link between the master station M1 and the ATC center 130, FIG. 1. Any ground station may serve as a master station as determined by the ATC center if all ground stations receive radio signals from each other, are equipped with an identical GPS receiver and there is a direct ground communication link between each ground station and that ATC center 130. The frequency spectrum allocated worldwide to all ground stations is preferably made available by ICAO from the existing frequency spectrum allocated to DME infrastructure, which is 962–1213 MHZ. Other suitable frequency spectrums could be used. In order to minimize the use of frequency spectrum, each ATC TWR area may use the same frequency worldwide for its group of five ground stations, named F1 and all APP/ACC areas could use worldwide fourteen frequencies F2 . . . F15 for their respective ground stations where the allocation of frequency for APP/ACC areas will follow similar rules as used in cellular telephony. The same will apply for the areas where there are many airports such as ACC1 and ACC2, FIG. 5, and for each airport that has more than one runway such as TWR A and TWRs 1, 2 and 3, FIG. 5. A special frequency F16 is allocated worldwide for contingency reasons as explained later. Each ground station M1–M5 has worldwide a dedicated receiver 70, FIG. 6, tuned on F16 frequency. Each ground station M1–M5 has the GPS receiver 50 and a dedicated surveillance module 200.

The GPS receiver 50 monitors and validates the ground station M1–M5 3D position and delivers to that ground station the UTC clock as long as the 3D position provided by the GPS receiver 50 is identical with the known geographical position of that ground station (within +/−10 meters accuracy and +/−20 ns(rms) accuracy to UTC). Based on the above, all ground stations are located in the ICAO worldwide navigation database with their 3D positions, a unique ID code assigned to each station, their frequency of operation and the range of communication of its transmitted signals. The range of ground stations for each ATC area is selected such that any aircraft in one ATC airspace receives also the radio signals from the adjacent ATC area ground stations such as ACC 1, 2 and 3, FIG. 5. The range of the onboard surveillance module 200' is selectable, manually or automatically, with one range for TWR operation, a second different range for APP operation and another one for ACC operation, based on aircraft altitude and its determined 3D position in order to be received by all ground stations allocated to that ATC area, regardless the 3D position of aircraft within that ATC airspace.

The known geographical distances between master ground stations M1 and slave ground stations M2–M5 are depicted as LM1M2, LM1M3, LM1M4, LM1M5, FIG. 1, and are introduced worldwide in the navigation database (not shown). Also, the geographical distances between slave ground stations M2–M5 are known and introduced within the same worldwide navigation database.

The system including the ground stations and aircraft surveillance modules and related systems operate in a surveillance cycle for computing one aircraft 3D position, a selected aircraft SAC, and repeats such cycles for all aircraft in the airspace allocated to that ATC center, whether it is an ACC, APP or TWR center in a surveillance process.

A unique identifying ID code is assigned to each of the aircrafts Av1, Av2, . . . , Avs, . . . , Avm. The ID code of the aircraft operating in that ATC airspace, on ground or in flight, is provided automatically and in real time to that ATC system, whether ACC, APP or TWR, by the ATM system database 32, FIG. 6. The master ground station M1 transmits a radio communication signal S1 containing the selected aircraft (SAC) ID code and the ID code of the master ground station to that SAC. See FIG. 8.

All slave ground stations M1–M5 and all aircraft $AV_1$–$AV_m$ in the ATC area receive, also, the signal S1. At the moment of receiving the S1 signal, after a transmission delay td1, FIG. 8, and a processing time period T1 for signal S1 needed for its computations in its surveillance module 200', the selected aircraft SAC transmits via its transmitter 70, FIG. 7, a radio communication signal S2, containing the master ground station M1 ID code, its own altitude and ID code. At the moment of receiving the S2 signal from the selected aircraft after transmission delay td2, FIG. 8, the master ground station M1, after a further same time period T1, needed for processing its computations in its surveillance module 200, transmits a radio communication signal S3, containing the selected aircraft (SAC) ID code, the value of the computed distance ds1 between the master station M1 and the selected aircraft SAC and the master ground station ID code. At the moment of receiving the S3 signal after transmission delay td3, the selected aircraft after the same period of time T1 transmits a radio communication signal S4 containing the master station M1 ID code, the distance value ds2 between the SAC aircraft and master station M1, measured onboard the SAC, and the aircraft ID code. All of the radio communication signals S1–S4 are received after the corresponding transmission delays td1–td4 by all ground stations M1–M5 and all other aircraft located in that ATC area.

At the moment of receiving the S3 signal from the master ground station M1 after transmission delay td3, all slave ground stations M2–M5 and all other aircraft being in that ATC area now know the distance ds1 between the master ground station M1 and the selected aircraft SAC. The surveillance cycle 74, FIG. 8, continues, after the same time delay T1, with a radio communication signal S5 generated by the master ground station M1 containing the ID code of the first slave ground station M2 and the ID code of master station M1. At the receiving moment of the S5 signal after time transmission time delay td5, the selected slave station M2, after the same processing period time delay T1, transmits a radio communication signal S6, containing the ID code of master station M1, the ID code of the selected aircraft, the distance value ds3 between the selected aircraft SAC and the respective slave station M2, computed locally by this slave station M2, and that slave station M2 ID code. After receiving the S6 signal after transmission delay td6, the master station M1 after the same period of time T1 continues the above process, FIG. 8, with all other slave ground stations M3–M5, one after the other in sequence by generating signals S7, S8, S9, S10, S11, S12 with the same time delay T1 and transmission delays td7–td12 between successive signals. It should be understood that at the same time all aircraft in the ATC area also receive all signals transmitted by the master and slave stations (all such receiving of the signals not being shown in FIG. 8).

When the master station M1 receives the S12 radio signal from the last slave ground station M5 then, the master ground station M1 generates a special radio communication signal S0 containing the master station M1 ID code and its UTC clock value at time CV at the beginning of the transmission of the S0 signal. The signal S0 is received by all of the ground stations M1–M5 and the selected aircraft SAC. The UTC clock has a value in milliseconds, microseconds and nanoseconds of its current UTC second. With the S0 signal and their known distance value to the master ground station, all slave stations M2–M5 and selected aircraft SAC synchronize their own UTC clock with the master station UTC clock at the level of nanoseconds in their respective surveillance modules 200. After transmitting the S0 signal, the surveillance cycle 74, FIG. 8, for the one SAC aircraft is complete.

Figure 8:
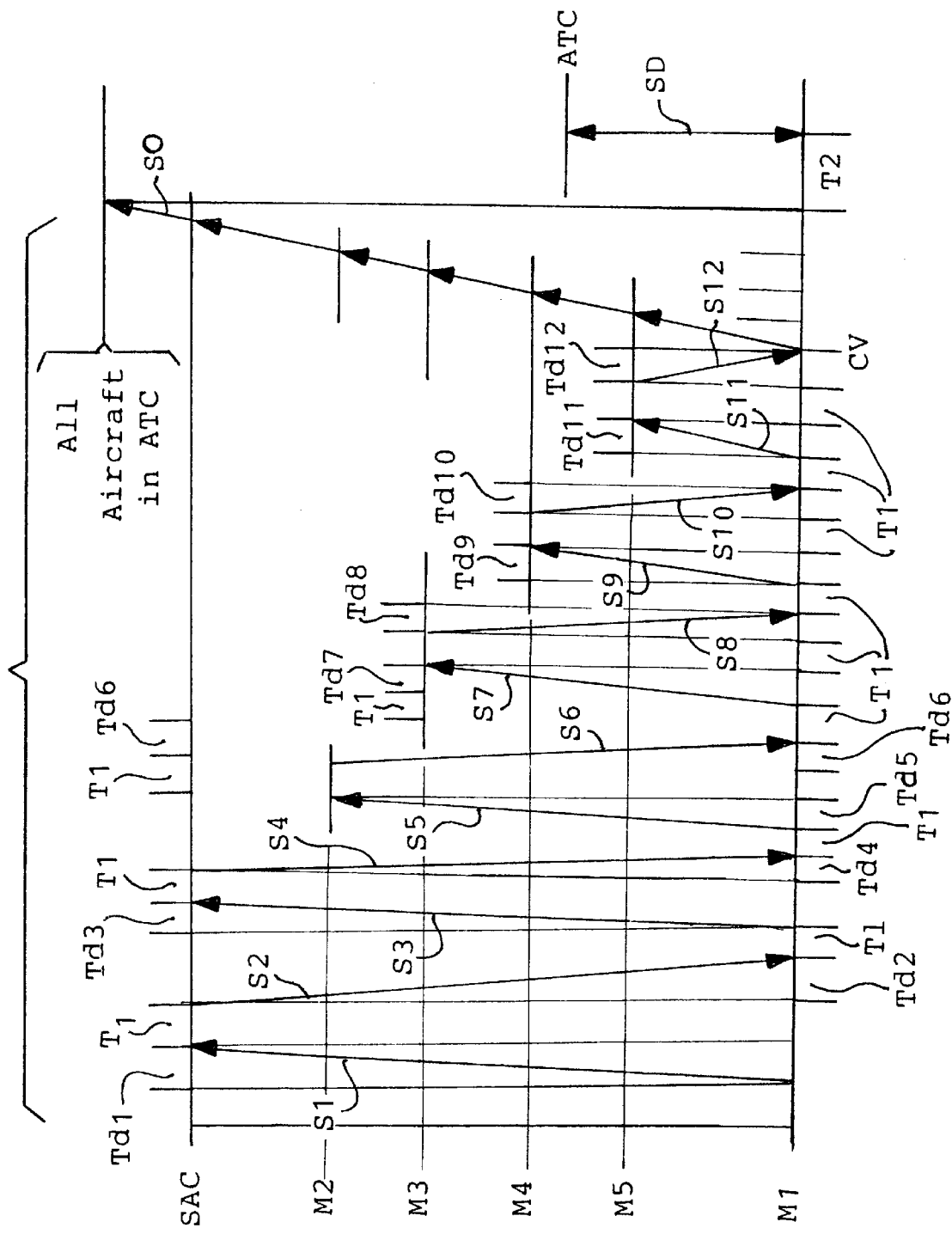
FIG. 8 is a timing chart useful in explaining the principles of the present invention.

A new surveillance cycle for the next aircraft AC1 from a list of aircraft provided by the ATM database 32, FIG. 6, will continue after a predefined period of time T2, FIG. 8 after the S0 signal is received by all of the aircraft in the ATC area. During the T2 period, the master ground station may transmit or receive data to/from ATC center 130. When there are no aircraft in the list, provided by the ATM database 32 for that ATC area or the selected aircraft SAC is not responding within a predefined period of time, selected for that ATC area, then the ATC system will perform its surveillance cycle without S1 and/or S2, S3, S4 signals and will check again the list during the time period T2. After power up, the master ground station M1 for the ATC area performs, first, a calibration surveillance cycle containing the radio signals S5, S6, S7, S8, S9, S10, S11, S12, S0 and then follows this cycle with a surveillance cycle selecting the first aircraft SAC from the list provided by the ATM database 32. During the calibration surveillance cycle, all ground stations M1–M5 check and adjust, if needed, their precise oscillator frequency, used for distance measurements, as is described later, and synchronize their UTC clock, if needed, with the master ground station UTC clock 60.

At the moment of receiving the S1 signal, all slave ground stations M2–M5 start a time counter 108, FIG. 2, in the main microprocessor associated with each station in its surveillance module 200, which counter measures the time elapsed in number of nanoseconds until the stations each receive the S2 signal. The time delays [tn=(td1+td2)] between the receiving moments of S1 and S2 is defined by the formula:

$$tn = (LM1Mn - DM1Avs)/c + DMnAvs/c + T1$$

where n=the respective slave ground station (M2, M3, M4 or M5);

tn=time delay, measured in nanoseconds, by using the slave station precise DDS-Driven PLL oscillator in the surveillance module 200 associated with each slave station M2–M5;

LM1Mn=known geographical distance value between the master ground station and the respective slave ground station (M2, M3, M4, M5) (in feet);

DM1Avs=unknown distance value, measured in feet, between the selected aircraft SAC and the master ground station M1;

DMnAvs=unknown distance value, measured in feet, between the selected aircraft (Avs) and the respective slave ground station (M2, M3, M4, M5);

c is the speed of the radio signal (0.98 feet/nanosecond);

T1 is the known time delay, in nanoseconds, to cover the common identical computation period of each surveillance module 200, 200'. This value is established on a worldwide basis.

After receiving the S3 radio signal by the SAC Avs, the value of DM1Avs is known. The following formula results in the distance value, measured in feet, between the respective slave ground station M2–M5 and the selected aircraft SAC:

DMnAvs=(tn—T1 )*c+(DM1Avs–LM1Mn) where a signal manifesting the DM1Avs value is received by each ground station M2–M5 within the range of the S3 radio signal.

Similarly, onboard of the selected aircraft SAC Avs, the same procedure is used to compute the distance value between the selected aircraft and each slave ground station M2–M5. For this, there are four dedicated time counters such as counter 108 in each surveillance module 200' to measure the time delays td5 and td6, FIG. 8, in nanoseconds, between the receiving moments of radio signals S5, S6 for first slave station M2, delay td7 and td8 for signals S7,S8 for the second slave station M3, time delays td9 and td10 for signals S9,S10 for the third slave station M4 and time delays td11 and td12 for signals S11,S12 for the fourth slave ground station M5.

The time delay tns (td5–td12), measured in nanoseconds, between the receiving moments of above sets of radio signals, is defined by the formula:

$$tn = (LM1Mn - DAvsM1)/c + DAvsMn/c + T1$$

where n=the respective slave ground station (M2, M3, M4 or M5);

tn=time delay measured in nanoseconds, using the aircraft precise DDS-Driven PLL oscillator;

LM1Mn=known geographical distance value between the master ground station and the respective slave station (n=M2, M3, M4, M5) (feet);

DAvsM1=known distance value, measured in feet, between the selected aircraft and master ground station M1;

DAvsMn=unknown distance value, in feet, between the selected aircraft Avs and respective slave ground station M2–M5;

c is the speed of the radio signal (0.98 feet/nanosecond);

T1 is the known time delay value, in nanoseconds, for local surveillance module 200 computations.

The below formula provides the distance value between the selected aircraft and respective slave ground station:

$$DAvsMn = (tn - T1)*c + (DAvsM1 - LM1Mn)(\text{feet})$$

Each aircraft in that ATC area, including the selected aircraft, receives the distance values, measured on the ground, between all ground stations M1–M5 and the selected aircraft within the range of the radio signals S3, S6, S8, S10, S12.

Based on the above calculated distance values and the ground stations M1–M5 3D known geographical coordinates, the selected aircraft SAC computes, onboard, via its surveillance module 200' its unique 3D position. Similarly, each aircraft in that ATC area computes independently of the other aircraft and ground stations and simultaneously therewith the same 3D position of the selected aircraft SAC based on the distance values received from ground stations. In the same time periods, the on ground ATC system stations M1–M5 compute, independently of each other and the aircraft, the 3D position of the selected aircraft based on the distance values measured on ground by each ground station M1–M5 and transmitted to the master ground station.

All other aircraft in this ATC airspace employs the same procedure to compute the distance value between that other aircraft and each slave ground station M2–M5. For this, four dedicated onboard time counters in each surveillance module 200' count the pulses applied thereto to measure the time delay td, FIG. 8, in nanoseconds, between the receiving moments of radio signals S5, S6 for first slave station M2, signals S7, S8 for the second slave station M3, signals S9, S10 for the third slave station M4 and signals S11, S12 for the fourth slave ground station M5. All of the signals S1 and so on are applied to the TX/RX module 70 for transmission.

The time delay, td, measured in nanoseconds, between the receiving moments of above sets of radio- signals is defined by the formula:

$$tn = (LM1Mn - DAvmM1)/c + DAvmMn/c + T1$$

where n=the respective slave ground station(2,3,4 or 5), tn=time delay, measured in nanoseconds, using that aircraft precise DDS-Driven PLL oscillator;

LM1Mn=known geographical distance between the master ground station M1 and the respective slave stations (n=M2, M3, M4, M5) (in feet);

m=any aircraft with receiver frequency tuned on M1 . . . M5 ground stations frequency of the selected ATC area;

DAvmM1=known distance, measured in feet, between that aircraft and the selected master ground station M1 (measured onboard that aircraft as a difference between the UTC clock value at transmission of S0 and the UTC clock value at the time of receiving onboard that aircraft of the S0 signal);

DAvmMn=unknown distance, measured in feet, between that aircraft and respective slave ground station;

c is the speed of the radio signals (0.98 feet/nanosecond),

T1=known time delay, measured in nanoseconds, needed for local computations.

The above formula results in the distance value between that other aircraft and the respective slave ground stations:

$$DAvmMn=(tn-T1)*c+(DAvmM1-LM1Mn)$$

The next surveillance cycle will begin with the selection of the next aircraft from the ATM database by generating a new set of radio communication signals S1, S2, S3, S4, S5, S6, S7, S8, S9, S10, S11, S12, S0. This process referred herein as the surveillance process ends with the processing of the 3D position in the last surveillance cycle corresponding to the last aircraft in the ATM database allocated to that airspace. If an aircraft, in flight, is not selected, due to any reason, by any master ground station M1 for a period of time T3, defined by aeronautical authorities, that aircraft will transmit after each predefined period of time, T4, a radio communication signal Ss on a fixed F16 frequency containing the ID code of that aircraft and its UTC time at beginning of that transmission. If the master station M1 for that ATC area detects such a signal Ss, than at the end of the processing of the aircraft on the list of selected aircraft provided by ATM database, the surveillance process is continued by selecting that aircraft or those aircraft, one by one, and by amending the ATM data base by adding the latter aircraft to the ATM data base 32, FIG. 6. The 3D position of such added aircraft will be known by the time difference, measured on the ground by the synchronized UTC clocks of all ground stations M1–M5, between the time of transmission and time of receiving by the associated surveillance module 200.

Any aircraft, which is not in the ATM database 32 and is detected by military radar, is transferred to the appropriate military authorities. When all of the aircraft from the ATM database 32 has been selected by the master ground station M1, a new surveillance process begins.

The design and the technology used by the system of the present invention is able to complete an entire ATC surveillance process within a time limit specified for an ACC, an APP, or a TWR ATC area.

Each aircraft is equipped with two surveillance modules 200', FIG. 7. Each module 200', FIGS. 2 and 7 (without the GPS receiver), has a precise DDS driven oscillator 10, a UTC clock 60 and associated electronic circuitry. The module 200' (and module 200, FIG. 6) selects any frequency value for receiving or transmitting via transmitter/receiver 70, FIG. 7, dedicated radio signals within a range of F1 . . . F16 allocated by ICAO and associated range for the ATC ACC/APP/TWR areas.

Each aircraft has its own dedicated ID code (internationally allocated and known) and starts operation with the system of the present invention from an airport, at the gate, when its engines are turned on becoming an active aircraft.

The pilot selects the frequency of that airport, and the aircraft onboard system is switched on in the GROUND mode of operation. In this mode of operation, the onboard system will need the 3D position of the aircraft to be introduced manually by the flight crew in the appropriate avionics system. Based on this data, the onboard systems know the distance between the aircraft and the master ground station M1 of that ATC area and will use signal S0 to synchronize the aircraft UTC clock with the master ground station M1 UTC clock. The surveillance module 200 onboard that aircraft then determines its 3D position. If the computed 3D position of the aircraft, using ground station signals, is identical with the manually introduced 3D position, then the onboard UTC clock will be synchronized with that master ground station M1 UTC clock for that ATC area and the onboard systems will be switched automatically by the aircraft avionics system in GROUND mode operation. From this moment on, the onboard systems will compute the aircraft 3D position and will wait until the ATC system is ready to accept the aircraft to be inserted within its ATM database 32. From that moment on, the aircraft is selected in the surveillance cycle for that ATC area which at this time may be a TWR area, by receiving its dedicated S1 signal from the master ground station M1 of that ATC area, and one of its onboard systems will be switched automatically in the NAV mode.

During flight, the crew selects one system for operation on the frequency of that ATC area and a second system may be selected on the same frequency or on a previous frequency or on a following ATC area or on an adjacent ATC area. Each onboard surveillance system, at least two being onboard each aircraft, will compute and display the aircraft 3D position using a different group of ground stations in the range of that aircraft such as a TWR area and an APP area or an APP and an ACC areas. In such mode of operation, one of the onboard systems will be in a NAV mode in its avionics system and the second one will be in a FLIGHT mode. During FLIGHT mode operation, the surveillance system will perform the same processing algorithm for its aircraft 3D position calculations as in the NAV mode with only one difference. The distance value between the aircraft and selected master ground station M1 from the selected ATC area is computed onboard using the S0 signal received from selected master ground station M1. The distance values between the aircraft and each of the slave stations M1–M5 from the selected ATC area is computed onboard the aircraft by the system switched to FLIGHT mode using the same type of radio communication signals S5, S6, S7, S8, S9, S10, S11, S12, S0 generated by the ground stations M1–M5 from the selected ATC area.

If the crew, during flight, does not select on any system the correct frequency for that ATC area where it is flying, then one of the onboard surveillance systems, after the T3 time period selects automatically an ALERT mode. In this mode, the aircraft transmits, after each period of time T4, its ID code and the UTC time at beginning of transmission, on a dedicated frequency F16. This ALERT mode is selected automatically if neither onboard surveillance system is selected for a surveillance cycle in the last time period T3, where time period T3 is established on a worldwide basis. In such cases, air traffic controllers will use VHF communication or UHF voice/data communication channel to communicate with that aircraft and crew to solve the problem. By using the above procedure and infrastructure, the surveillance system will manage to use only 16 MHZ of frequency spectrum from the existing DME spectrum of 252 MHZ (962–1213 MHZ). The released frequency spectrum of 236 MHZ may then be used for onboard passengers voice/data communication, for voice/data communications between aircraft and between aircraft and air traffic control center and/or to increase the existing frequency spectrum allocated to mobile communication, GPS or satellite communications.

The surveillance system works identically for TWR, APP or ACC areas in any ATC area, the only difference being the frequency of operation, the ground stations ID code, their 3D geographical coordinates and range.

During the surveillance cycle, as described above, the master ground station will measure also the distance to each slave station M2–M5 where the master station M1 uses five different counters from which one is dedicated for distance measurement to the selected aircraft and the other four for distance measurement to each slave station M2–M5. For this, each counter dedicated to a slave station measures the time delay td, FIG. 8, between the moment of transmitting and the moment of receiving of the radio signals S5, S6 for the first slave station M2, signals S7, S8 for the second station M3, signals S9, S10 for the third station M4 and signals S11, S12 for the fourth slave station M5. If such time delays are named as t1, t2, t3, t4 for the respective slave stations M2–M5, than the value of distance between master station and each slave station, measured by master station using its DDS-Driven PLL oscillator, is:

$DM1M2=(t1*c-T1*c)/2$ (feet);

$DM1M3=(t2*c-T1*c)/2$ (feet);

$DM1M4=(t3*c-T1*c)/2$ (feet);

$DM1M5=(t4*c-T1*c)/2$ (feet);

The known geographical distances between master station and each of the slave stations are available from the navigation database and they are LM1M2, LM1M3, LM1M4, LM1M5 measured in feet. Based on the above, the mean value of the difference between the real values and the measured ones of the distances is:

$D=((LM1M2-DM1M2)+(LM1M3-DM1M3)+(LM1M4-DM1M4)+(LM1M5-DM1M5))/5$ (feet)

From the above, the adjustment of DDS-Driven PLL oscillator 20 frequency of 1016 MHZ of the master station is defined by the value of DELTA=D/c (nanoseconds) where c=0.98 feet/nanosecond. The value of D will cover the influence of any variable factors responsible for generating the difference between the real value of the distances and the measured ones.

In order to use the same frequency for distance measurements during one surveillance process, the value of DELTA is computed at the end of a surveillance process when its value will be DELTAm=(D1+D2+ . . . +Dm)/m (nanoseconds), where D1 is the difference computed during the first surveillance cycle and Dm is the difference computed during the surveillance cycle, m, corresponding to the last aircraft from the ATM database.

The value of DELTAm is transferred to the dedicated microprocessor 19 in order to adjust accordingly the 1016 MHZ signal of oscillator 20.

Periodically, the master ground UTC clock 60 value, generated by its own DDS-Driven PLL oscillator 10 of 1000 MHZ+/−1 HZ, is compared with the UTC clock value provided by the GPS receiver 50 installed at the master ground station M1 location. If there are differences between these clocks and the 3D position provided by GPS receiver is identical with the known geographical 3D coordinates of that master station (within +/−10 meters accuracy), then a correction of the DDS-Driven PLL oscillator 10 frequency of 1000 MHZ+/−1 HZ will apply for any differences greater than 20 ns (rms).

Each slave ground station M2–M5 uses same procedure. The measured distance between that slave station and master station is obtained by measuring the time delay td6 and td7 between the transmitting and receiving moments of respective radio signals S6, S7 for the first slave station M2, signals S8, S9 for the second slave station M3, signals S10, S11 for the third station M4 and signals S12, S0 for the fourth slave station M5. The correction of the 1016 MHZ frequency of DDS-Driven PLL oscillator 20 is applied at the end of surveillance process.

The selected aircraft uses the same number of surveillance module 200' counters and the same procedure to control and adjust the frequencies of its DDS-Driven PLL oscillator 10. The distance values measured on the ground are considered real values and are compared with those measured onboard and any correction will apply to the 1016 MHZ frequency oscillator 20. The difference between the onboard UTC clock 60 value at the moment of receiving S0 signal and the master station M1 UTC clock 60 value at the moment of transmission of the S0 signal added to the time td needed by the S0 signal to travel the distance between the master station and the selected aircraft, measured on the ground, with a standard speed of 0.98 feet/ns is used onboard for any correction of the 1000 MHZ frequency of the DDS-Driven PLL oscillator 10. The correction will apply after each surveillance cycle when the aircraft was selected.

For the areas where the ground stations could visually see each other, than each slave station may use also the distances to other slave stations to control its DDS-Driven PLL oscillator 20 frequency of 1016 MHZ.

For validation of any aircraft 3D position calculations, the onboard and on ground surveillance module systems use a computed distance values, between that 3D position of the aircraft and the known 3D position of the fourth M4 and the fifth M5 ground station, with a measured distance between the aircraft and that station. Also, the aircraft onboard measured distance between the selected aircraft and master station M1 and the altitude of selected aircraft, received within the range of the S2 signal, are used by the ATC system for its monitoring and adjustment procedures during its computation algorithm of 3D position of selected aircraft.

Figure 3:
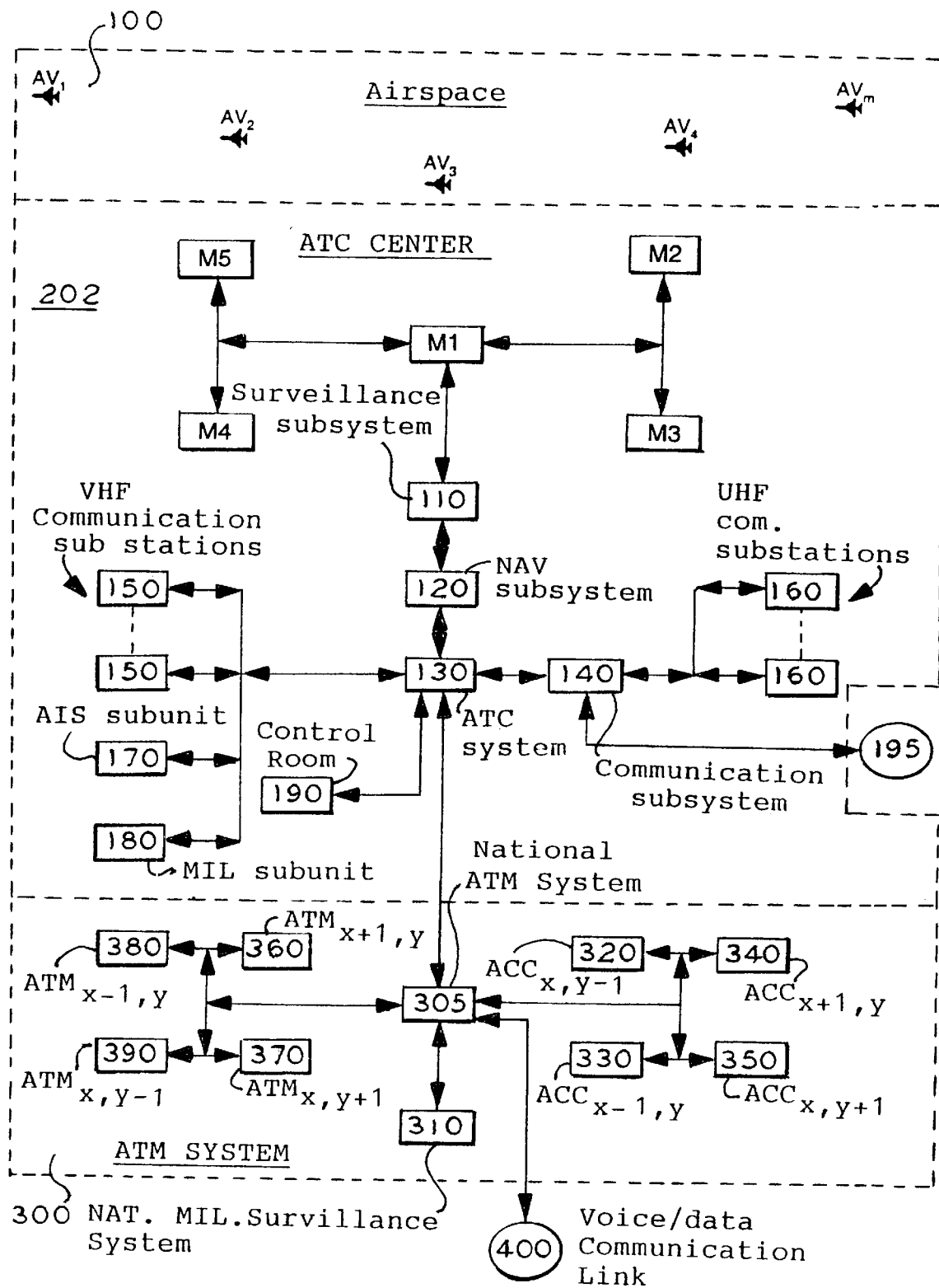
FIG. 3 is a block diagram depicting the functional interrelationship between ATC systems and aircraft within an integrated Air Traffic Management System.

With reference to FIG. 3, a block diagram of the system depicting functional interrelationship between ATC units and aircraft within an integrated Air Traffic Management System is presented. A plurality of aircraft Av1, Av2, Av3, Av4, . . . , Avm are operating within an airspace 100 allocated to an ATC center 202 which is part of an integrated ATM system 300.

The ATC area could be a TWR, an APP or an ACC and its infrastructure is formed by a number of five ground stations depicted as M1, M2, M3, M4, M5 from which M1 is selected as master station and M2, M3, M4, M5 are selected as slave stations. The infrastructure includes an ATC system 130 comprising a surveillance subsystem 110, a subsystem for navigation 120 and a subsystem for communication 140, a number of VHF voice communication stations 150 spread over the ATC area, a number of UHF voice/data communication stations 160 spread over the ATC area, an AIS/MET subunit 170, a MIL subunit 180 and a control room 190 where air traffic controllers monitor and control the entire operation of the aircraft Av1, . . . , Avm within allocated aerospace 100.

As described above, the master ground station M1 provides to the ATC system 130 all the distance values between each ground station M1–M5 and selected aircraft together with the distance value between the selected aircraft and master ground station M1, provided by the selected aircraft.

All of this data is provided via a ground communication link between the master ground station M1 and ATC system 130.

The surveillance subsystem 110 provides the master ground station M1 the list of aircraft Av1, . . . , Avm which are operating in that ATC 202 area and also computes the 3D position of selected aircraft during the surveillance process.

The navigation subsystem 120 computes the ground speed and track for aircraft Av1, . . . , Avm and also transmits/receives the same data to/from adjacent, ATC unit in order to update the ATM database with aircraft coming or going to/from this ATC area.

The communication subsystem 140 provides a voice/data communication link between aircraft Av1, . . . , Avm or between these aircraft and ATC system by using UHF communication stations 160, spread over the ATC area. In the same time the communication subsystem 140 provides a direct connection to a public network (not shown) for passengers onboard of aircraft Av1, . . . , Avm. Every aircraft may transmit or receive to/from the 130 ATC system any navigation/flight or meteorological data or voice messages. The frequency spectrum allocated to the UHF radio communication stations 160 is made available worldwide from the released DME spectrum of 236 MHZ. The VHF radio communication stations 150 use the same frequency spectrum as today and used for voice communication between air traffic controllers and aircraft Av1, . . . , Avm. The AIS/MET subunit 170 and MIL subunit 180 provide traffic and meteorological information and civil-military coordination at the level of that ATC airspace.

The control room 190 is organized in the appropriate manner for a TWR, an APP or an ACC control center with dedicated display consoles for air traffic controllers and associated equipment and activities for that ATC center. Due to its design and operation, the system 130 allows flexible use of airspace and free flight with their benefits.

The ATC unit 202 is connected within an ATM system 300 with its upper ATC area unit such as a TWR with APP, APP with ACC and all ACC's connected together to form an integrated ATM system.

When ATC system 130 is an ACC then this unit may be named ACCx,y and is connected, within a national ATM system 305, with its adjacent ACC's like ACCx-1,y, 330, ACCx+1,y, 340, ACCx,y-1, 320 and ACCx,y+1, 350. In such infrastructure, the national ATM system 305 could also be named ATMx,y and such national system is connected with its adjacent systems like ATMx-1,y ,380, ATMx+1,y, 360, ATMx,y-1, 390 and ATMx,y+1, 370 and building in such a way an international unique system. The national ATM system 305 has its voice/data communication with national military surveillance system 310 and with an international/regional center through voice/data communication link 400.

During the functioning of the ATM system in accordance with the present invention, any mobile, including mobile phone, may determine its 2D ground position by using the same set of radio signals generated by the ATC systems. For this, the Rubidium oscillator 12, FIG. 2, is replaced by a crystal oscillator where the distance measurement's accuracy will remain the same, due to the ability of DDS-Driven PLL oscillator 10 to adjust its frequencies. Using this technology, any mobile 2D position may be controlled from any local center by using a two-way radio communication device from that local center to all mobiles equipped accordingly.

Any mobile, including mobile phone, which receive the radio signals S5, S6, S7, S8, S9, S10, S11, S12, S0 from the ground stations M1–M5, being tuned on ground station frequency, determines its 2D position by using two time counters (not shown) for each slave station.

The first time counter (not shown) measures the time delay td between receiving moments of pair of signals S5, S6 or S7, S8 or S9, S10 or S11, S12. The second time counter (not shown) measures the time delay between the receiving moments of the pair of signals S6, S7 or S8, S9 or S10, S11 or S12, S0.

If the first time delay is dt1n, the second is dt2n, the distance between the mobile and master station is A and the distance to a slave station is Bn, then:

$$dt1n = (LM1Mn - A + Bn)/c + T1 \text{ (nanoseconds)};$$

$$dt2n = (LM1Mn - Bn + A)/c + T1 \text{ (nanoseconds)}$$

where n=the respective slave station (M2, M3, M4, M5).

With the above measured time delays, the 1000 MHZ frequency of the mobile DDS-Driven PLL oscillator (such as oscillator 10, surveillance modules 200, 200' for example) is adjusted by fulfilling the following equation:

$$((dt1n + dt2n) - 2*T1) = (2*LM1Mn/c);$$

where T1, LM1Mn, c were defined above.

In order to compute the 2D position of the mobile it is necessary, after power up of the mobile system, that the operator introduce, manually, its known local 2D position. Based on this, the mobile UTC clock, at a level of last UTC second, will be synchronized with master ground station UTC clock, after receiving the S0 signal and knowing the real distance between the mobile and master station and the standard value of c=0.98 feet/ns. Immediately after that, the mobile system computes its 2D position knowing the value of A, based on the difference between the UTC clock value of the mobile and the UTC clock value of the master ground station M1, and computing the value of Bn, based on the value of dt1n and dt2n for each slave station by using the formula:

$$(dt1n - dt2n)*c/2 = Bn - A;$$

where T1, LM1Mn, c were defined above.

If, the computed 2D position validates the manually introduced one, by comparing the values of Bn as above for each slave station with the correspondent values resulting from the 2D position of the mobile and the known geographical coordinates of that slave stations, then the mobile system is switched automatically in REF mode of operation. From now on, the mobile system is fully operational and will compute its 2D position based on the value of A and Bn, computed as above, and the procedure to adjust 1000 MHZ frequency of its DDS-Driven PLL oscillator is as described above.

The landing and take off surveillance operation of an aircraft will be described in connection with FIG. 4. In this operation, it is desired that the pilot know exactly where on the runway his aircraft is located so that he can make a decision based on known factors for his particular aircraft as to abort a take off or landing due to the aircraft having insufficient runway to complete the landing or takeoff procedure. Accidents presently occur with aircraft on the runway due to failure of the pilot to accurately know the exact position of his aircraft relative the various critical points on the runway for a given aircraft state in the takeoff or landing mode.

Figure 4:
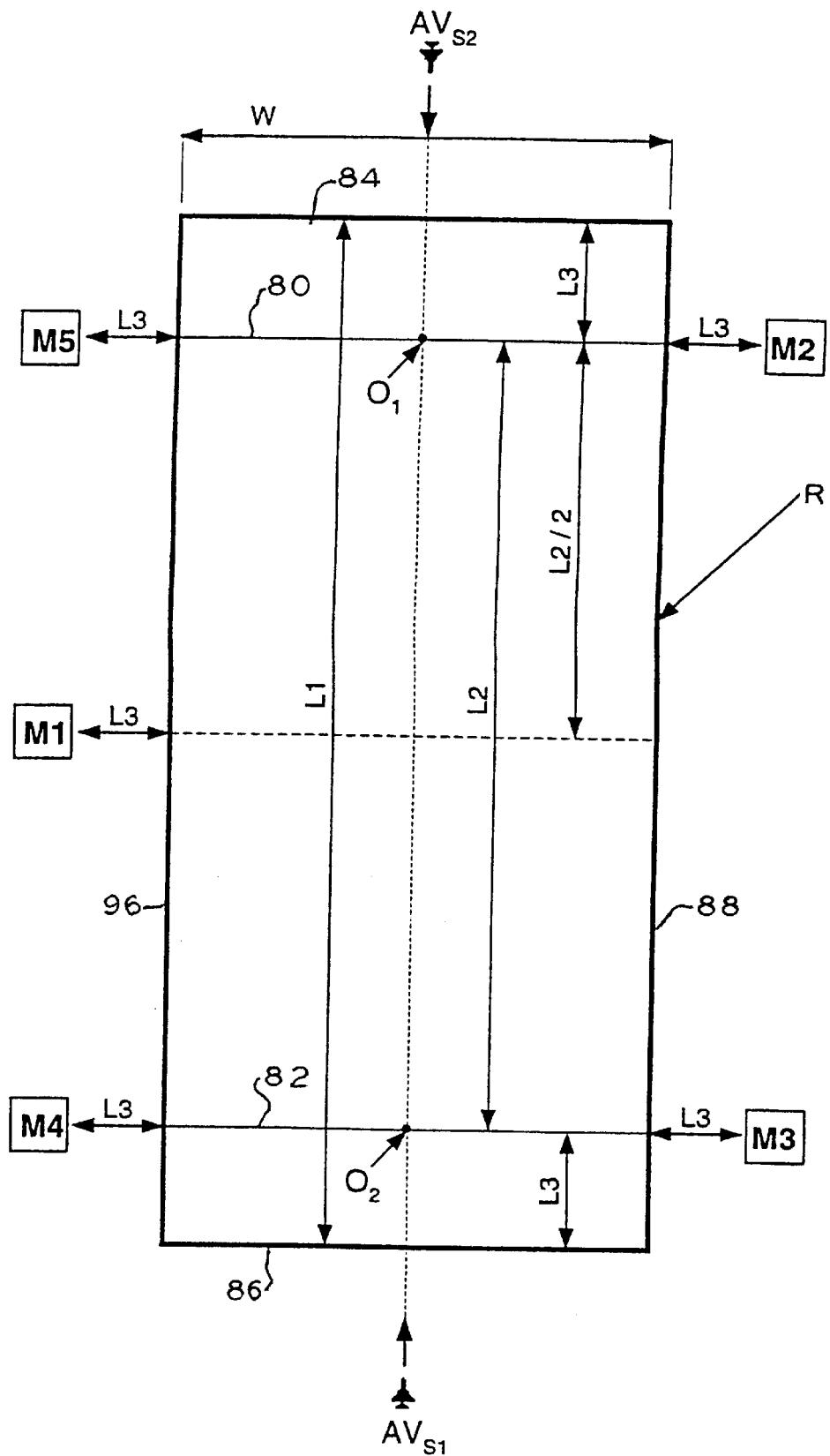
FIG. 4 is a pictorial representation of a group of five ground radio-communication stations used as an Instrument Landing System (ILS) for the opposing landing directions of a runway.

In FIG. 4, the same ground radio-communication stations, depicted as M1, M2, M3, M4, M5, in which M1 is a master station and M2, M3, M4, M5 are slave stations. These stations are located around one runway R which has a total length of L1 and width of W. The ends of the runway R are marked with respective aircraft touch-down lines 80, 82, each located at a known distance L3 from the corresponding runway end 84, 86. Two slave stations, M2, M5, are located on one touch-down line 80 and the other two slave stations, M3, M4, are located on the other touch-down line 82. The slave stations M2, M3 are located on the same side 88 of the runway R. The slave stations M4, M5 are located on the other side 96 of the runway R. Each station is located at a distance L3 to the next adjacent runway side. The master station M1 is located in the middle of the length L1 of runway and on the side 96 at which slave stations M4, M5 are located. Station M1 is at the same distance L3 from side 96 as the respective slave stations to that side of runway R.

The surveillance modules 200 of such ground station locations and onboard aircraft surveillance modules 200' do not use, during the landing and take-off operation, the S4 and S0 radio communication signals and the T3, T4 time delays as described above.

For instrument landing system (ILS) operation, the onboard surveillance module 200' uses only the distance values to the ground stations where the first surveillance module of modules 200' operates with the distance values to the ground stations, measured onboard the aircraft, and the second surveillance module 200' uses the same distance values measured on the ground by each ground station and transmitted to the aircraft; both onboard surveillance modules being tuned to the operation frequency of these ground stations.

During approach and landing, the aircraft is transferred from the TWR database to the ILS database (not shown) and keeps the status of "selected aircraft" until such aircraft lands and leaves the runway area and then is transferred back to the TWR database based on its 3D position computed by the ILS ground system during the whole process of approach and landing in the TWR area. After that, a new aircraft will be selected and transferred to that ILS. Any aircraft may also select any runway direction for landing where the onboard surveillance module works identically.

The Localizer and Glide Slope functions (not shown) of the existing ILS, is performed, onboard by aircraft surveillance modules 200', by computing and delivering the appropriate signals to all other existing onboard avionics systems. For Localizer deviation signal, the onboard surveillance module will compute the value of:

$$dL = ((DAvs1M2 + DAvs1M3) - (DAvs1M4 + DAvs1M05)) \text{ for } Avs1, \text{ and}$$

$$dL = ((DAvs2M2 + DAvs2M3) - (DAvs2M4 + DAvs2M5)) \text{ for } Avs2$$

For Glide Slope deviation signal, the onboard surveillance module will compute the value of:

$$dH = dHR - dHAvs, \text{ where}$$

dHR=DO1O2+DO1Avs1+DAvs1O2R, where DO1O2 is a known value of that runway,

DO1Avs1 is a computed value based on measured distance of, DAvs1M2 and DAvs1M5 and the known value of W and L3 and DAvs1O2R is a required value for measured distance value DAvs1M3 and DAvs1M4 to keep aircraft Avs1 on a defined Glide Slope to that runway landing direction.

$$dHAvs = DO1O2 + DO1Avs1 + DAvs1O2M,$$

where DO1O2 and DO1Avs1 are defined above and DAvs1O2M is a computed value based on the real measured distance values of DAvs1M3 and DAvs1M4

From the above results:

$$dH1 = DAvs1O2R - DAvs1O2M \text{ for aircraft depicted as } Avs1 \text{ and}$$

$$dH2 = DAvs2O1R - DAvs2O1M \text{ for aircraft depicted as } Avs2$$

Any deviation value computed as above is a Glide Slope signal for that aircraft.

The system in accordance with the present invention presents the following advantages:

It uses a unique infrastructure for computing, simultaneously, onboard and on ground the same 3D position of any aircraft in flight or on the ground within an ATC airspace with the same accuracy and being synchronized with a UTC clock;

During a surveillance cycle, all aircraft compute, onboard, their 3D position together with "the selected aircraft" 3D position and consequently at the end of one surveillance process every aircraft will have onboard its 3D position and the 3D positions of all other aircraft operating within that ATC airspace, selected one by one within the surveillance cycle 74 (FIG. 8), and that ATC center will have, on the ground, the 3D positions of all aircraft selected within the surveillance cycles;

Every aircraft in flight or on the ground, within an ATC airspace, has onboard the appropriate data for a fully operational TCAS;

Every mobile may use the same infrastructure to compute its 2D position;

Every dedicated receiver with a fixed location may synchronize its UTC clock with the master ground station UTC clock where such dedicated receiver could be any equipment of a private or public entity, homes with their appliances, etc;

Any aircraft may perform a fully automated operation from a Gate to any other Gate, using the described system infrastructure and existing onboard flight control and navigation systems;

The costs of using such infrastructure by aircraft and mobiles is comparable with the existing costs of ground communication services and is not related to aircraft maximum take-off weight while the concept of free flight and flexible use of airspace is fully supported.

The system infrastructure most likely will be Government property and available for use by any user. The costs of implementation can be covered by a license fee, paid by the manufacturers of the dedicated surveillance modules or dedicated receiver modules. The costs of operations of such a system may be covered by license fee paid by those users which are licensed to be monitored within the surveillance process.

The system m ay also be used by military authorities, with a different frequency of operation, for their aircraft operation within the same ATC airspace, where the military aircraft use the same signals with encrypted ID codes for the transmitters and receivers, and where any military aircraft can determine any civil aircraft 3D position within that ATC airspace and any other military aircraft 3D position if the appropriate ID codes are provided. The system can also be used where any civil aircraft can not see a military operation and where the coordination is performed on the ground between civil ATC centers and military ATC centers.

The described system may be used by any aircraft carrier during its naval operations where the system provides full support for such operation including precise landing procedures.

Military operation of such a system may use mobile ground stations with their updated 3D positions and any number of ATC centers also located on any mobile on the ground or onboard of any aircraft as long as they are within the range of their own ground stations.

There thus has been shown a surveillance system using ground radio-stations and including an aircraft, all being equipped with a dedicated surveillance module, and an ATC center. The surveillance system comprises a master ground radio-station with known geographical 3D coordinates, located in the center of an ATC area, equipped with a dedicated surveillance module and is able to transmit and receive, on a fixed frequency and through its dedicated surveillance module, radio communication signals within a range specifically determined for that ATC area which can be received by any slave ground radio-communication station tuned on the same frequency and located in that ATC area and by any aircraft or mobile in flight or on ground within that ATC area regardless their 3D position within that ATC airspace and with a dedicated alert receiving channel tuned on a unique worldwide established frequency.

The system may include a minimum of four slave ground radio-communication stations with their known geographical 3D coordinates located in the same ATC area, each of them equipped with a dedicated surveillance module and able to transmit and receive, on the same fixed frequency as master ground station, through their dedicated surveillance module, radio communication signals within the same specifically determined range for that ATC area, which can be received by master ground radio-communication station and all aircraft or mobile being in flight or on ground within that ATC area regardless their 3D position within that ATC airspace and with the same dedicated alert receiving channel, as master station, tuned on the same unique worldwide established frequency.

A GPS receiver is installed at each ground station location to monitor and validate 3D geographical coordinates of that ground station within an accuracy up to +/−10 meters and to provide UTC clock reference to that ground station within +/−20 ns(rms) accuracy as long as the 3D position provided by GPS receiver are identical with that ground station 3D geographical coordinates.

An ATC center has a ground communication link with that master ground station or is able to transmit or receive on the same fixed frequency as a master ground station radio communication signals within the same specific range for that ATC area which can be received by master ground station and all slave ground stations located in that ATC area and by all aircraft or mobile in flight or on the ground within that ATC area regardless their 3D position within that ATC airspace.

A dedicated surveillance module is onboard each aircraft in flight or on the ground, to transmit and receive, on the same fixed frequency as used by master ground station, slave ground stations and ATC center, radio communication signals, within a range specifically determined for that ATC area, which can be received by master ground station and all slave ground stations, located in that ATC area, and by the ATC center and to select, for its transmitting and receiving radio signals, any frequency within the allocated worldwide frequency spectrum for ATC operation.

A dedicated receiver is on each mobile able to receive the radio communication signals transmitted by master ground station and any slave station.

A receiver is associated with the master ground station to receive from an ATM database, through that ATC center, an updated list with all aircraft ID codes of aircraft in flight or on the ground within that ATC airspace and may add to such a list any aircraft code received through dedicated alert channel;

A radio transmitter is associated with master ground surveillance module to generate a sequence of interrogation radio communication signals to a selected aircraft, from the list provided by the ATM database through the ATC center, and to each slave ground station.

The sequence comprises:

(a) a first interrogation signal S1 from the master station addressed to the selected aircraft containing the ID code of this signal S1, the ID code of selected aircraft and the ID code of master ground station;

(b) a receiving radio communication signal S2 from the selected aircraft, transmitted by that aircraft after a worldwide known T1 time delay from the moment of receiving the S1 signal, containing the ID code of this signal S2, the ID code of master ground station, the altitude and the ID code of selected aircraft;

(c) a second interrogation signal S3 generated from the master station after a worldwide known T1 time delay from the moment of receiving S2 signal, addressed to the same selected aircraft, containing the ID code of this signal S3, the ID code of the selected aircraft, the distance value to the selected aircraft, measured on the ground by the master station based on the time delay between the moment of transmission of signal S1 and the moment of receiving the signal S2 by taking out the known T1 value, and the ID code of master ground station M1;

(d) a receiving radio communication signal S4 generated by the selected aircraft, transmitted by that aircraft after the same T1 period of time from the moment of receiving S3 signal, containing the ID code S4 of this signal, the distance value to the master ground station, measured onboard based on the time delay between the moment of transmission of S2 signal and the moment of receiving S3 signal by taking out the known value T1, and the selected aircraft ID code;

(e) a third interrogation signal S5, generated from the master station after the same known T1 period of time from the moment of receiving the S4 signal, addressed to the first slave ground station, containing the ID code of this S5 signal, the ID code of the first slave station and the ID code of master station;

(f) a receiving radio communication signal S6 generated by the first selected slave ground station, transmitted by that slave station after the same known T1 period of time from the moment of receiving S5 signal, containing the ID code of this S6 signal, the distance value between this slave station and the same selected aircraft, measured on ground by this slave station, the ID code of the aircraft received through alert channel and distance to that aircraft measured by this slave station and the ID code of first slave station;

(g) a fourth interrogation signal S7, generated from the master station after the same known T1 period of time from the moment of receiving the S6 signal, addressed to the second slave ground station, containing the ID code S7 of this signal, the ID code of the second slave station and the ID code of master station;

(h) a receiving radio communication signal S8 from the second selected slave ground station, transmitted by that slave station after the same known T1 period of time from the moment of receiving S7 signal, containing the ID code of this S8 signal, the distance value between this slave station and the same selected aircraft, measured on ground by this slave station, the ID code of the aircraft received through alert channel and distance to that aircraft measured by this slave station, and the ID code of second slave station;

(i) a fifth interrogation signal S9, generated from the master station after the same known T1 period of time from the moment of receiving the S8 signal, addressed to the third slave ground station, containing the ID code of this S9 signal, the ID code of the third slave station and the ID code of master station;

(j) a receiving radio communication signal S10 from the third selected slave ground station, transmitted by that slave station after the same known T1 period of time from the moment of receiving the S9 signal, containing the ID code of this S10 signal, the distance value between this slave station and the same selected aircraft, measured on ground by this slave station, the ID code of the aircraft received through alert channel and distance to that aircraft measured by this slave station, and the ID code of third slave station;

(k) a sixth interrogation signal S11, generated from the master station after the same known T1 period of time from the moment of receiving the S10 signal, addressed to the fourth slave ground station, containing the ID code of this signal S11, the ID code of the fourth slave station and the ID code of master station; addressed to the fourth slave ground station, containing the ID code of this signal S11, the ID code of the fourth slave station and the ID code of master station;

(l) a receiving radio communication signal from the fourth selected slave ground station, transmitted by that slave station after the same known T1 period of time from the moment of receiving S11 signal, containing the S12 ID code of this signal, the distance value between this slave station and the same selected aircraft, measured on ground by this slave station, the ID code of the aircraft received through alert channel and distance to that aircraft measured by this slave station, and the ID code of the fourth slave station;

(m) a UTC clock synchronization radio signal S0 from the master station addressed to all aircraft or mobile being in flight or on ground in that ATC airspace and to all slave ground stations containing the ID code of this signal S0, the UTC clock value at the moment beginning of transmission S0 signal, measured in milliseconds, microseconds and nanoseconds, within the current second of the master ground station UTC clock, and the master ground station ID code;

(n) a worldwide known waiting period of time T2, after transmitting S0 signal needed for transmitting/receiving data to/from ATC center.

A receiver associated with master ground station surveillance module identifies each of receiving radio signals such as signals S2, S4, S6, S8, S10, S12 and measures, in nanoseconds, the time delay periods between the transmitting moment and the receiving moment of signals S1, S2 and S5, S6 and S7, S8 and S9, S10 and S11, S12;

Each slave station surveillance module has a receiver associated therewith able to identify each of receiving radio signals such as S1, S2, S3, S4, S5, S6, S7, S8, S9, S10, S11, S12, S0 and to respond to the master station, after a known time period T1, with a dedicated signal such as signal S6 generated by a first slave station, signal S8 generated by the second slave station, signal S10 generated by the third slave station and signal S12 generated by the fourth slave station, value between that slave station and selected aircraft, measured on ground by that slave station, and the ID code of that slave station.

Each slave station surveillance module measures in nanoseconds the time delay period between the moments of receiving of the signals S1 and S2 and between the moment of transmitting and the moment of receiving of the S6, S7 signals for the first slave station, signals S8, S9 for the second slave station, signals S10, S11 for the third slave station and S12, S0 for the fourth slave station.

Each aircraft surveillance module identifies each of the receiving radio signals such as signals S1, S3, S5, S6, S7, S8, S9, S10, S11, S12, S0 transmitted by ground stations and to measure the time delay between the moment of transmitting and the moment of receiving of the S2, S3 signals and between the moments of receiving of the signals S5, S6 and S7, S8 and S9, S10, and S11, S12.

Any receiver, with a fixed location or on a mobile location, identifies, on a selected frequency, the radio communication signals such as signals S5, S6 or S7, S8 or S9, S10 or S11, S12 and S0 and to measure in nanoseconds the time delay between the moments of receiving of the pair of signals such as signals S5, S6 and S6, S7 or S7, S8 and S8, S9 or S9, S10 and S10, S11 or S11, S12 and S12, S0.

Any surveillance module located on ground at each ground station generates a clock signal of one nanoseconds period using a DDS-Driven PLL technology and a Rubidium oscillator of 50.255055 MHZ, or crystal oscillator with the same frequency and similar accuracy, as a reference for DDS circuit with its associated circuitry to deliver an output of 10 MHZ+/−0.011 HZ and a fixed multiplication factor of one hundred for the PLL circuit with its associated circuitry to deliver an output signal of 1 GHZ+/−1 Hz and to maintain all time such output at a fixed value of 1 GHZ+/−1 HZ by using as reference the difference between local ground station UTC clock value and the UTC clock value provided by GPS receiver installed at each ground station location.

Any surveillance module located onboard of each aircraft generates a clock signal of one nanoseconds period using a DDS-Driven PLL technology and a Rubidium oscillator of 50.255055 MHZ, or crystal oscillator with the same frequency and similar accuracy, as a reference for DDS circuit with its associated circuitry to deliver an output of 10 MHZ+/−0.011 HZ and a fixed multiplication factor of one hundred for the PLL circuit with its associated circuitry to deliver an output signal of 1 GHZ+/−1 Hz and to maintain all time such output at a fixed value of 1 GHZ+/−1 HZ by using as reference the master ground station UTC clock value received onboard within S0 and the time needed by S0 signal to travel the distance between master ground station and selected aircraft, measured on ground.

Any surveillance module located at each ground station generates a distance measurement signal of one pulse/foot using a DDS-Driven PLL technology and the same Rubidium oscillator of 50.255055 MHZ, or crystal oscillator with similar accuracy, as a reference for a DDS oscillator circuit with its associated circuitry to deliver an output of 10.16 MHZ+/−0.011 HZ and a fixed multiplication factor of one hundred for the PLL circuit with its associated circuitry to deliver an output signal of 1016 MHZ and to adjust permanently such frequency to keep the rate of one pulse/foot by using as an absolute reference the known geographical distances between master ground station and each of the slave ground station during the distance measurement procedure performed by master station and each of slave station using the time delay between the moment of transmitting and the moment of receiving of the signal pairs S5, S6 and S7; S8 and S9, S10 and S11, S12 for the master station and signals S6, S7 for the first slave station and signals S8 S9 for the second slave station and signals S10, S11 for the third slave station and signals S12, S0 for the fourth slave station and by taking out from each of the above time delay the value of universal calculation time period T1 for each surveillance module.

A surveillance module located onboard of each aircraft to generate a distance measurement signal of one pulse/foot using a DDS-Driven PLL technology and the same Rubidium oscillator of 50.255055 MHZ, or crystal oscillator with similar accuracy, as a reference for a DDS oscillator circuit with its associated circuitry to deliver an output of 10.16 MHZ+/−0.011 HZ and a fixed multiplication factor of one hundred for the PLL circuit with its associated circuitry to deliver an output signal of 1016 MHZ and to adjust permanently such frequency to keep the rate of one pulse/foot using as an absolute reference the distance between the aircraft and master ground station, measured by the master ground station and transmitted to the aircraft within the S3 signal and between the aircraft and each slave ground station, measured by that slave station and transmitted to the aircraft within the S6 signal for the first slave station, within the signal S8 for the second slave station, within the S10 signal for the third slave station and within the signal S12 for the fourth slave station and compare these distance values with the same values measured onboard the aircraft.

Each aircraft surveillance module includes a computer to compute, during period of being "selected aircraft", onboard the 3D position of that aircraft based on the distance values between that aircraft and each of the the five ground station, measured onboard of that aircraft and the same distance values measured on ground by each of the five ground station and transmitted by radio communication signals S3, S6, S8, S10, S12 to all aircraft being in flight or on ground within that ATC airspace and known 3D geographical coordinates of each of the five ground stations, where one surveillance module is selected within a surveillance cycle formed by signals S1–S12 and S0 and computes onboard the 3D aircraft position based on aircraft onboard measured distances and a second onboard surveillance module computes onboard 3D position based on ground measured distances and synchronizes both the onboard surveillance module UTC clocks to the master ground station UTC clock, based on distance value to that master station, measured on ground by that master station, and the S0 signal, and computing the same 3D position of that aircraft, outside of "selected aircraft" period, based on the distance value between that aircraft and selected master ground station, by using the time delay between the moment of transmitting and the moment of receiving of the S0 signal from the selected master station, measured onboard by the aircraft UTC clock, and the distance values between that aircraft and each slave ground station from that group of selected master station, measured onboard of that aircraft, based on time delays measured between the receiving moments of signals S5, S6 for the first slave station and signals S7, S8, for the second slave station and siganls S9, S10, for the third slave station and signals S11, S12, for the fourth slave station and knowing the same 3D geographical coordinates of each of the five ground station selected by that onboard surveillance module.

One or more computers are at each ATC center location to compute the 3D position of selected aircraft by using the distances values between each of the ground station and selected aircraft, measured on ground by each ground station and transmitted to that ATC center, and the same known 3D geographical coordinates of each of ground station and associated validation procedure by using the altitude of selected aircraft transmitted within S2 signal and distance value between selected aircraft and master ground station, measured onboard, transmitted within S4 signal.

A switching arrangement (not shown) is at each aircraft surveillance module for selecting a GROUND mode of operation when the aircraft is on ground and that surveillance module is power up. The crew selects a TWR frequency used for ATC surveillance operation and introduces manually the 3D position of the aircraft. This enables the system surveillance module to determine the distance to that master ground station within that TWR area and to synchronize the onboard UTC clock with that master station UTC clock. This sequence occurs after receiving the S0 signal from that master station. The GROUND mode is displayed. The onboard 3D computed position is identical with the manually introduced 3D position and keeps this mode of operation until the TWR system automatically selects this aircraft during its surveillance cycle. This occurs when the aircraft receives its S1 interrogation signal and one of its surveillance modules is switched automatically in a NAV mode of operation and the second surveillance module keeps its GROUND mode of operation as long as the aircraft is on ground and FLIGHT mode of operation after take-off.

An arrangement is associated with each aircraft surveillance module to select the LANDING mode of operation when the aircraft is in flight within a TWR area and is preparing for landing to a runway equipped with a system according to the present invention and where the TWR system automatically transfers the aircraft to that runway system, based on the 3D position of that aircraft computed on ground by that TWR system. The respective aircraft then becomes a "selected aircraft" for that runway system and the onboard surveillance modules, both switched automatically in LANDING mode, receive a signal manifesting the distance to that master station, located at one side of that runway and at the middle distance between the ends of that runway, and to the slave stations of that runway system where two slave station are located at one end of that runway and other two slave stations are located on the other end of that runway. The surveillance system computes onboard the distance values to that master station and to each of four slave station allocated to that runway system and determines onboard the aircraft the deviation signals to the direction of that runway, similar with the existing LOCALIZER signal of an ILS system and to the required glide slope of that runway, similar with the existing Glide Slope signal of an ILS. The LANDING mode of operation is kept as long as the aircraft is on the runway surface and this mode of operation is then changed to NAV mode, for one onboard surveillance module and to the GROUND mode for the second module, immediately after the aircraft leaves the runway surface and is transferred automatically back to that TWR system based on the 3D position of that aircraft computed on ground by that runway system.

An arrangement is associated with each aircraft surveillance module to select TAKE-OFF mode of operation when the aircraft is on ground within a TWR area and selected in the ATM database. One of its surveillance modules is in the NAV mode and the other is in the GROUND mode of operation. When that aircraft is preparing for take-off on a runway equipped with a system in accordance with the present invention, that aircraft is automatically transferred by the TWR system to that runway system, based on the 3D position of that aircraft computed on ground by that TWR system, and the respective aircraft becomes a "selected aircraft" for that runway system. Both onboard surveillance modules are automatically switched to TAKE-OFF mode of operation and then both onboard surveillance modules then compute the onboard deviation signal to the middle of that runway, based on the distance values, measured onboard, to each of the slave stations of that runway system, and the distances to the end of that runway. At that end are located two slave stations and at the other end of the same runway are located the other two slave stations. Such aircraft keep this mode of operation until the runway system transfers automatically this aircraft back to the TWR system based on the 3D position of this aircraft computed on the ground by that runway system.

During time T2, upon command of the ATC, the master station may be selected from any of the group of stations M1–M5. This might occur for example should the present master station become inoperative.

It will occur to one of ordinary skill that the disclosed embodiments are for illustration and not limitation. Various modifications may be made to the disclosed embodiments without departing from the scope of the invention as defined in the appended claims.

What is claimed is:

1. A surveillance system for air traffic control in selected ATC areas comprising:
   first means for independently and simultaneously determining the 3D location in flight and on the ground of all active aircraft in the selected aircraft ATC area; and
   second means onboard each aircraft for indicating the determined 3D locations of all said active aircraft;
   said first means comprises a plurality of ground stations corresponding to each said selected area, each said ground station including a first surveillance module for determining the 3D position of all associated aircraft in said selected area.

2. The system of claim 1 wherein the first surveillance module in each of the ground stations are identical and further including a second surveillance module in each of the aircraft identical to the ground station first surveillance module, each first and second modules including calculating means for calculating the 3D position of all said aircraft based on a measured distance between each aircraft and each ground station.

3. The system of claim 2 wherein the first and second surveillance modules each include 3D position calculating means for calculating the distance between each aircraft and each ground station.

4. The system of claim 3 including means for synchronizing each calculating means of each module with each other.

5. The system of claim 2 including a minimum of four ground stations including a ground master station with the remaining stations forming slave stations, each ground station and aircraft having a unique ID code, each ground station and aircraft including transmitter/receiver means for communicating with each other a plurality of information signals, each information signal from a ground station including the ground station ID code and each aircraft information signal including an aircraft ID code, said calculating means for calculating the distances based on the transmission delays of said information signals to and from the aircraft and ground stations, a portion of each said information signals including said calculated distances.

6. The system of claim 5 wherein all said information signals together form a surveillance cycle, the system including an ATM data base associated with an ATC and further comprising:

means in the master ground station surveillance module to generate a sequence of radio communication signals, for a list of aircraft provided by the ATM database through an ATC center flying in the air space of the ATC, to each slave ground station and to a selected aircraft; the sequence comprising:
(a) a first interrogation signal S1 from the master station addressed to the selected aircraft containing the ID code of this signal S1, the ID code of selected aircraft and the ID code of master ground station;
(b) a receiving radio communication signal S2 from the selected aircraft, transmitted by that selected aircraft after a worldwide known T1 time delay from the moment of receiving the S1 signal, containing the ID code of this signal S2, the code of master ground station, the altitude and the ID code of selected aircraft;
(c) a second interrogation signal S3 generated from the master station after a worldwide known T1 time delay from the moment of receiving S2 signal, addressed to the same selected aircraft, containing the ID code of this signal S3, the code of the selected aircraft, the distance value to the selected aircraft, measured on the ground by the master station based on the time delay between the moment of transmission of signal S1 and the moment of receiving the signal S2 by taking out the known T1 value, and the ID code of master ground station M1;
(d) a receiving radio communication signal S4 generated by the selected aircraft, transmitted by that aircraft after the same T1 period of time from the moment of receiving S3 signal, containing the ID code S4 of this signal, the distance value to the master ground station, measured onboard based on the time delay between the moment of transmission of S2 signal and the moment of receiving S3 signal by taking out the known value T1, and the selected aircraft ID code;
(e) a third interrogation signal S5, generated from the master station after the same known T1 period of time from the moment of receiving the S4 signal, addressed to the first slave ground station, containing the ID code of this S5 signal, the code of a first slave station and the code of master station;
(f) a receiving radio communication signal S6 generated by the first selected slave ground station, transmitted by that slave station after the same known T1 period of time from the moment of receiving S5 signal, containing the ID code of this S6 signal, the distance value between this first slave station and the same selected aircraft, measured on ground by this slave station, the ID code of the aircraft received through alert channel and distance to that aircraft measured by this first slave station and the ID code of the first slave station;
(g) a fourth interrogation signal S7, generated from the master station after the same known T1 period of time from the moment of receiving the S6 signal, addressed to a second slave ground station, containing the ID code S7 of this signal, the code of the second slave station and the ID code of master station;
(h) a receiving radio communication signal S8 from the second selected slave ground station, transmitted by that slave station after the same known T1 period of time from the moment of receiving S7 signal, containing the ID code of this S8 signal, the distance value between this second slave station and the same selected aircraft, measured on the ground by this slave station, the ID code of the aircraft received through an alert channel and the distance to that aircraft measured by this slave station, and the ID code of second slave station;

(i) a fifth interrogation signal S9, generated from the master station after the same known T1 period of time from the moment of receiving the S8 signal, addressed to the third slave ground station, containing the ID code of this S9 signal, the ID code of the third slave station and the ID code of master station;

(j) a receiving radio communication signal S10 from the third selected slave ground station, transmitted by that slave station after the same known T1 period of time from the moment of receiving the S9 signal, containing the ID code of this S10 signal, the distance value between this slave station and the same selected aircraft, measured on ground by this slave station, the ID code of the aircraft received through alert channel and distance to that aircraft measured by this slave station, and the ID code of third slave station;

(k) a sixth interrogation signal S11, generated from the master station after the same known T1 period of time from the moment of receiving the S10 signal, addressed to the fourth slave ground station, containing the ID code of this signal S11, the ID code of the fourth slave station and the code of master station;

(l) a receiving radio communication signal S12 from the fourth selected slave ground station, transmitted by that slave station after the same known T1 period of time from the moment of receiving S11 signal, containing the S12 ID code of this the distance value between this slave station and the same selected aircraft, measured on ground by this slave station, the ID code of the aircraft received through the alert channel and the distance to that aircraft measured by this slave station, and the ID code of the fourth slave station; and (m) a UTC clock synchronization radio signal S0 from the master station addressed to all aircraft in flight or on the ground in that ATC airspace and to all slave ground stations, the signal S0 containing the ID code of this signal S0, the UTC clock value at the moment CV of the beginning of transmission of the S0 signal, and the master ground station ID code.

7. The system of claim 6 wherein each slave station surveillance module has a receiver associated therewith to identify each of a plurality of received radio signals S1, S2, S3, S4, S5, S6, S7, S8, S9, S10, S11, S12, S0 and to respond to a transmission from the master station, after a known generated T1 period of time, with a dedicated signal S6 by a first slave station, with a dedicated signal S8 by a second slave station, with a dedicated signal S10 by a third slave station and with a dedicated signal S12 by a fourth slave station, each signal containing the ID code of such signal, the ID code of the selected aircraft, the distance value between that slave station and selected aircraft, measured on ground by that slave station, and the ID code of that slave station.

8. The system of claim 6 wherein each aircraft second surveillance module includes a computer for computing, during the period of being a "selected aircraft", onboard the selected aircraft the 3D position of that aircraft based on the distance values between that aircraft and each of the said ground stations, measured onboard of that aircraft and the same distance values measured on the ground by each of the ground stations and transmitted by radio communication signals S3, S6, S8, S10, S12 to all active aircraft in flight or on the ground within that ATC airspace and known 3D geographical coordinates of each of the ground stations, where the second onboard surveillance module is selected within a surveillance cycle formed by signals S1–S12 and S0 for computing onboard the 3D aircraft position based on the aircraft onboard measured distances and a third onboard surveillance module for computing onboard that aircraft the 3D position based on ground measured distances and for synchronizing both onboard surveillance module UTC clocks to a master ground station UTC clock, based on distance value to that master station, measured on the ground by that master station, and the S0 signal, and computing the same 3D position of that aircraft, outside of the "selected aircraft" surveillance cycle period, based on the distance value between that aircraft and the selected master ground station, by using the time delay between the moment of transmitting and the moment of receiving of the S0 signal from the selected master station, measured onboard by an aircraft UTC clock, and the distance values between that aircraft and each slave ground station from a group of selected ground stations, measured onboard of that aircraft, based on time delays measured between the receiving moments of signals S5, S6 for a first slave station and signals S7, S8, for a second slave station and signals S9, S10, for a third slave station and signals S11, S12, for a fourth slave station and knowing the same 3D geographical coordinates of each ground station selected by the corresponding onboard second surveillance module of the selected aircraft.

9. The system of claim 6 wherein each slave station surveillance module includes means for measuring in nanoseconds the time delay period between the moments of receiving of the signals S1 and S2 and between the moment of transmitting and the moment of receiving of the S6, S7 signals for the first slave station, signals S8, S9 for the second slave station, signals S10, S11 for the third slave station and signals S12, S0 for the fourth slave station.

10. The system of claim 6 wherein each aircraft second surveillance module identifies each of the receiving radio signals S1, S3, S5, S6, S7, S8, S9, S10, S11, S12, S0 transmitted by the ground stations and to measure the time delay between the moment of transmitting and the moment of receiving of the S2, S3 signals and between the moments of receiving of the signals S5, S6 and S7, S8 and S9, S10, and S11, S12.

11. The system of claim 6 wherein said transmitter/'receiver means includes means such that any receiver, at a fixed location or on a mobile location, identifies, on a selected frequency, radio communication signal pairs S5–S6, S7–S8, S9–S10, S11–S12 and signal S0 and includes means to measure in nanoseconds the time delay between the moments of receiving of the pairs of signals S5–S6 and S6–S7 and S7–S8 and S8–S9 and S9–S10 and S10–S11 and S11, S12 and S12, S0.

12. The system of claim 6 including clock means wherein each first surveillance module located on the ground at each ground station generates a clock signal of one nanosecond period using a DDS-Driven PLL oscillator and an oscillator of 50.255055 MHZ as a reference for the DDS oscillator to deliver an output of 10 MHZ+/−0.011 HZ and a fixed multiplication factor of one hundred for the PLL oscillator to deliver an output signal of 1 GHZ+/−1 Hz and to maintain at all times such output at a fixed value of 1 GHZ+/−1 HZ by using as reference the difference between a local ground station UTC clock value and a UTC clock value provided by a GPS receiver installed at each ground station location.

13. The system of claim 6 including clock means wherein each second surveillance module located onboard of each aircraft generates a clock signal of one nanosecond period using a DDS-Driven PLL oscillator and an oscillator of 50.255055 MHZ as a reference for the DDS PLL oscillator to deliver an output of 10 MHZ+/−0.011 HZ and a fixed multiplication factor of one hundred for the PLL oscillator to deliver an output signal of 1 GHZ+/−1 Hz and to maintain at all times such output at a fixed value of 1 GHZ+/−1 HZ by using as reference the master ground station UTC clock value received onboard within the signal S0 and the time delay of the S0 signal to travel the distance between the master ground station and the selected aircraft, as measured on ground.

14. The system of claim 6 wherein each first surveillance module located at each ground station generates a distance measurement signal of one pulse/foot using a DDS-Driven PLL oscillator and an oscillator operating at 50.255055 MHZ as a reference for the DDS PLL oscillator to deliver an output of 10.16 MHZ+/−0.011 HZ and a fixed multiplication factor of one hundred for the PLL oscillator to deliver an output signal of 1016 MHZ and to adjust such frequency to keep the rate of one pulse/foot by using as an absolute reference the known geographical distances between the master ground station and each of the slave ground stations during the distance measurement procedure performed by the master station and each slave station using the time delay between the moment of transmitting and the moment of receiving of the signal pairs S5, S6 and S7, S8 and S9, S10 and S11, S12 for the master station and signals S6, S7 for the first slave station and signals S8, S9 for the second slave station and signals S10, S11 for the third slave station and signals S12, S0 for the fourth slave station and by taking out from each of the above time delay the value of universal calculation time period T1 for each surveillance module.

15. The system of claim 6 wherein the second surveillance module onboard each aircraft includes means for generating a distance measurement signal of one pulse/foot using a DDS-Driven PLL oscillator and an oscillator of 50.255055 MHZ as a reference for the DDS oscillator to deliver an output of 10.16 MHZ+/−0.011 HZ and a fixed multiplication factor of one hundred for the PLL oscillator to deliver an output signal of 1016 MHZ and to adjust such frequency to keep the rate of one pulse/foot using as an absolute reference the distance between the aircraft and master ground station, measured by the master ground station and transmitted to the aircraft within the S3 signal and between the aircraft and each slave ground station, measured by that slave station and transmitted to the aircraft within the S6 signal for the first slave station, within the signal S8 for the second slave station, within the S10 signal for the third slave station and within the signal S12 for the fourth slave station and compare these distance values with the same values measured onboard the aircraft.

16. The system of claim 5 including an ATM system for selecting any of said slave stations as a master station.

17. The system of claim 2 including a plurality of ATC areas each having a master station and associated ground stations, at least one computer at each ATC center location to compute the 3D position of a selected aircraft by using the distances values between each ground station and the selected aircraft for each said ATC center, measured on the ground by each ground station and transmitted to that ATC center, and the same known 3D geographical coordinates of each of ground station and an associated validation procedure using the altitude of the selected aircraft transmitted within a first S2 signal and the distance value between the selected aircraft and the master ground station, measured onboard, transmitted within a second signal S4.

18. The system of claim 2 wherein the ground stations include a master station for generating an S0 signal manifesting the 3D position of each aircraft and associated slave stations, each station having a UTC clock, and including a TWR area in the ATC area, the aircraft each including a third aircraft surveillance module and a switching arrangement associated with each aircraft surveillance module for manually selecting a GROUND mode of operation when the aircraft is on ground, the switching arrangement including means arranged for manually selecting a TWR frequency used for an ATC surveillance and 3D positioning entering means to manually enter the 3D position of the aircraft to determine the distance to that master ground station within that TWR area and means for synchronizing an onboard UTC clock with the master station UTC clock after receiving the S0 signal from that master station, including display means for displaying the GROUND mode when the onboard 3D computed position is identical with the manually entered 3D position, the switching means for maintaining this mode of operation until the TWR system automatically selects this aircraft during a surveillance cycle when the aircraft receives an initial interrogation signal from the master station and the first surveillance module is switched automatically into a NAV mode of operation and the second surveillance module maintains its GROUND mode of operation for as long as the aircraft is on the ground in the active mode and in a FLIGHT mode after take-off.

19. The system of claim 2 including a TWR area, a runway including said ground stations comprising a master station and four slave stations forming a runway system, each aircraft including said second surveillance module and a third aircraft surveillance module, each aircraft second and third surveillance modules having a LANDING mode, and an arrangement associated with each aircraft surveillance module to select the LANDING mode of operation when the aircraft is in flight within the TWR area and is preparing for landing at the runway associated therewith, the TWR system including means arranged to automatically electronically transfer the aircraft to that runway system, based on the 3D position of that aircraft as computed on the ground by that TWR system, whereby the respective aircraft becomes a "selected aircraft" for that runway system and wherein the aircraft includes means for switching the onboard surveillance modules automatically into a LANDING mode, and each module is arranged to receive one or more signals manifesting the distance to that master station, located at one side of that runway medially between the ends of that runway, and manifesting the distance to the slave stations of that runway system wherein a first two slave stations are located at a first end of that runway and a second two slave stations are located on the other opposite second end of that runway, said surveillance modules for computing onboard the aircraft the distance values to that master station and to each of the four slave station allocated to that runway system and for determining onboard the aircraft deviation signals manifesting the deviation of the aircraft path to the center axial length direction of that runway and manifesting the required glide slope of that aircraft to the runway, said modules for maintaining the LANDING mode of operation as long as the aircraft is on the runway surface and includes means to change the mode of operation to NAV mode, for the first onboard surveillance module and to the GROUND mode of operation for the second module, the means for switching including means arranged for immediately after the aircraft leaves the runway surface to transfer the GROUND mode automatically back to that TWR system based on the 3D position of that aircraft computed on the ground by that runway system.

20. The system of claim 2 including a TWR area, a runway including said ground stations comprising a master station and four slave stations forming a runway system, each aircraft including said second surveillance module and a third aircraft surveillance module, the surveillance modules each having NAV, GROUND and TAKE OFF modes of operation, including an arrangement associated with each aircraft surveillance module to select the TAKE-OFF mode when the aircraft is on the ground within a TWR area and selected in an ATM database associated with that area and wherein a first surveillance module is in the NAV mode and the second module is in the GROUND mode, the TWR system including means for automatically electronically transferring the surveillance modules of the aircraft about to take off to that runway system, based on the 3D position of that aircraft computed on the ground by that TWR system, and the runway system including means for selecting the respective aircraft as a "selected aircraft" for that runway system, the runway system including means for automatically switching the first and second onboard surveillance modules to the TAKE-OFF mode, the onboard surveillance modules for computing the onboard deviation signal to the middle of that runway, based on the distance values, measured onboard, to each slave station of that runway system, and for computing the distances to a first end of that runway at which are located a first two slave station portion of that runway system and to a second end of the same runway opposite the first end at which are located a second two slave station portion of the runway system, including means such that the aircraft keeps this mode of operation until the runway system electronically automatically transfers this aircraft back to the TWR system based on the 3D position of this aircraft computed on the ground by that runway system.

21. The system of claim 1 wherein the selected area is an ACC area.

22. The system of claim 1 wherein the selected area is a TWR area.

23. The system of claim 1 wherein the selected area is a runway.

24. The system of claim 23 wherein each aircraft has a second surveillance module, the runway has a length L and a width W and first and second touch-down lines, including a master ground station at the center of said length on a first side of the runway, a first slave station on the first side at the first touch down line, a second slave station on the first side at the second touch down line, a third slave station on the second side at the first touch down line, and fourth slave station on the second side at the second touch down line, each station and aircraft including the respective first and second surveillance modules for determining the 2D position of an aircraft on the runway and including means for communicating with the aircraft second surveillance module.

25. A method to determine on the ground the distance value between any ground slave station and a selected aircraft using the time delay measured by that slave station between the receiving moments of S1 and S2 signals generated respectively by a ground station surveillance module and by a selected aircraft surveillance module and by receiving a first distance value between a master ground station and the selected aircraft, computed on the ground by that master station, within a S3 signal transmitted by that master station, said first distance value being computed by summing two components from which the first component is computed as a result of multiplication between the speed of light, in feet/ns, and the difference between the measured time delay between the S1 and S2 signals and the value of a T1 known time delay and the second component being computed as a difference between two distance values where the first distance value is the known distance value between the master station and the selected aircraft and the second distance value is the known geographical distance between the master station and that slave station.

26. A method to determine onboard of any active aircraft the distance value between that aircraft and each slave station of a plurality of stations and a master station on the ground using the time delay measured onboard of that aircraft between the receiving moments of S5, S6 signals corresponding to a first slave station, signals S7, S8 corresponding to a second slave station, signals S9, S10 corresponding to a third slave station and signals S11, S12 corresponding to a fourth slave station where the distance value is computed as the sum of two components, where the first component is a result of multiplication between the speed of light, in feet/ns, and the difference between the measured time delay and known value of a given T1 time delay and the second component is the computed difference between the distance value between the master ground station associated with the slave stations and the aircraft, measured onboard the aircraft, by using the time delay between the S2 and S3 signals generated by the master station during a "selected aircraft" status or as a time delay between the moment of transmitting and the moment of receiving of a surveillance signal S0 manifesting the 3D position of the aircraft, measured onboard the aircraft using a clock, or the same distance measured on the ground by the master station and transmitted to the aircraft within an S3 signal and the known geographical distance value between the master station and that slave station.

27. A method to determine the 2D position of a receiver having a UTC clock with a fixed location on the ground or on a mobile location on the ground each forming a ground station including a master station and a plurality of slave stations, each station having a UTC clock and to synchronize the receiver clock with the master ground station UTC clock, by using two time delay values measured at that fixed location or mobile location between the receiving moments of a set of S5, S6 signals or a set of S7, S8 signals or a set of S9, S10 signals or a set of S11, S12 signals manifesting different data at ground stations for first time delay measurements and between the receiving moments of the S6, S7 signals or the S8, S9 signals or the S10, S11 signals or the S12, S0 signals for the second time delay measurements where the first time delay measured value dt1 n is given by dt1n=(LM1Mn−A+Bn)/c+T1, where A is the distance value between that mobile or fixed ground station location and the master ground station, Bn is the distance value between that mobile or fixed ground station location and a selected slave ground station and LM1Mn is the known geographical distance between the master station and the selected slave station and c=0.98 feet/ns is the speed of light and T1 is a known time delay value and where the second time delay measured value dt2n is given by dt2n=(LM1Mn−Bn+A)/c+ T1, from which that mobile or fixed location station determines its 2D position by manually entering, for the first computation cycle after power up, its known 2D position from where the mobile or fixed location slave station computes its distance value to the master station and then synchronize its UTC clock with the master station UTC clock and validates its manually introduced 2D position by comparing the Bn computed value with the estimated values resulting from the manually introduced 2D position and known geographically coordinates of the slave stations and then determine that A value based on the time delay between the moment of transmitting an S0 signal by the master ground station and the moment of receiving S0 signal by the mobile or fixed location stations synchronized UTC clock and the value of the Bn distance by using the dedicated pair of signals from the ground stations allocated to that area and on which that mobile or fixed station receiver frequency is tuned and continuing to determine the 2D position of that mobile as long as is receiving the pair of signals.

28. A method to adjust any frequency deviation of a DDS-Driven PLL oscillator in a surveillance module in any ground station of a plurality of stations and in any active aircraft, the ground stations comprising a plurality of slave stations and a master station, the deviation being determined from the value of 1016 MHZ by comparing the known geographical distance value between the master ground station and each slave station with the measured distance value determined by each ground station as a measure of the time delay between the moment of transmitting and the moment of receiving of the sets of first signals S5, S6, signals S7, S8, signals S9, S10 and signals S11, S12 between the master ground station and the aircraft, and between the pairs of second signals S6, S7 for a first slave station, S8, S9 for a second slave station, signals S10, S11 for a third slave station and signals S12, S0 for a fourth slave station and the master station using the mean value of the difference between the known geographical distance value and the measured distance value computed by each ground station during a surveillance cycle determined by the surveillance module at each ground location and at each aircraft in communication with each other with certain of said signals and computing the appropriate frequency correction of that DDS-Driven PLL oscillator of that ground station and using the same correction procedure for each aircraft surveillance module DDS-Driven PLL oscillator using as the reference values for onboard correction the on ground measured distance values between each ground station and a selected aircraft and comparing these values with the same values measured onboard of the selected aircraft.

29. A method to adjust a frequency deviation from a fixed value of a DDS-Driven 1 GHz+/−1 HZ oscillator of a precise oscillator at a fixed ground or mobile station and employing an oscillator at 50 MHZ and where the frequency deviation of such DDS-Driven PLL oscillator is automatically compensated for by maintaining the condition $((dt1n+dt2n)-2*T1)*c=2*LM1Mn$ permanently fulfilled, where the measured value of dt1n, dt2n is directly affected by the DDS-Driven PLL oscillator frequency and consequently keeping this condition fulfilled, thus maintaining the frequency fixed to the 1 GHZ value for operating an aircraft surveillance system ground station UTC clock.

30. A method to compute onboard of an aircraft during the landing or take-off operation the value of runway direction deviation of the aircraft during said landing or take-off for a runway equipped with the system of claim 6 where the slave ground stations are located on each corner of that runway and the master ground station is located on one side of that runway at the half distance between the ends of that runway and where the direction deviation of an aircraft relative to that runway center length direction axis is computed as a difference between the sum of the distance values between the aircraft and two first slave stations located on one side of that runway and the sum of the same distance values between the aircraft and two second slave stations located on the other side of that runway.

31. A method to compute onboard an aircraft, during a landing operation in which the aircraft exhibits a first touch down line as the aircraft approaches a runway and touches the ground, the value of a deviation signal of the approaching aircraft from the desired glide path of that runway by computing the difference between the perimeter value of a triangle formed by the runway length L2 between the first touch down line and a second touch down line at the opposite end of the runway and the middle line of that runway and the actual position of the aircraft and a perimeter triangle formed by the runway length L2, a distance between the aircraft and the second touch down line computed onboard of the aircraft based on measured values of distances to slave ground stations located on that runway end to which the aircraft intends to finish its landing and corresponding computed onboard required distance value to the first touch down line of that runway to keep the aircraft on that desired glide path corresponding to the real distance values measured at each of the slave stations located at that runway end to which the aircraft intends to finish its landing, the difference being used as a Glide Slope signal.

32. An air traffic control system comprising:
   a plurality of ground stations each defining a corresponding unique first 3D position; and
   means onboard each aircraft of a plurality of aircraft and at each station for communicating with each other and to determine a second 3D position of each aircraft and each ground station based on the first 3D positions.

33. The system of claim 32 wherein the means for determining the second 3D positions comprises a surveillance module onboard each aircraft and at each station, each surveillance module including pulse generating means for generating pulses utilized for said determining said second 3D positions.

34. The system of claim 33 wherein the surveillance modules on each said aircraft include distance measuring means comprising counting means for counting said pulses manifesting the transmission times of signals S communicated between each of the stations and each of said aircraft and for determining the distance between each said aircraft and each said station and for computing the 3D aircraft position from the determined distances.

35. The system of claim 34 wherein each said ground station has a unique ID code and each said aircraft has a unique ID code, each ground station and each said aircraft including respective first and second transmitter/receiver means for communicating with each other a plurality of said signals S uniquely identified to the respective transmitting station and to each respective aircraft by said ID codes, said distance measuring means for computing said distances from the delays in said signals in the transmission of the signals.

36. The system of claim 35 wherein each said module includes means for determining the distances further based on a fixed delay T1 caused by the determining of each said distance.

37. The system of claim 36 wherein each said means for determining the distance includes oscillator means for generating an output signal having a plurality of pulses, each pulse manifesting a given distance value and computing means for counting said pulses manifesting the time delay of the transmission of a signal S from each aircraft to a ground station and from each ground station to an aircraft for said determining said distance and for transmitting said signals S including said determined distance to each other.

38. The system of claim 32 wherein each ground station includes a GPS receiver for providing a 3D validation signal for each said ground station determined 3D position.

39. A method of determining the 3D position of all active aircraft in a given ATC area comprising independently computing on board each said aircraft the 3D position of all said aircraft in a given time period and selectively displaying the computed 3D positions;

said independently computing comprising transmitting signals between each said active aircraft and each of a plurality of ground stations, measuring the transmission time delay of certain of the signals and computing from the time delays the distances between each aircraft and said ground stations and between selected ground stations to each other.

40. The method of claim 39 wherein said ground stations comprise a master station and a plurality of slave stations, the transmission of signals including transmitting a first set of signals between the master station and a selected aircraft of the plurality of aircraft and then transmitting a second set of signals between the master station and each said slave station, a first set of said signals for use in said measuring step and a second set of said signals for transmitting the measured distances to and from the selected aircraft and the master station and a third set of signals for transmitting the measured distances to and from the master station and each said ground station to form a surveillance cycle.

41. The method of claim 40 including repeating the cycle by selecting each aircraft as a selected aircraft.

42. The method of claim 40 including receiving all said signals at each said aircraft simultaneously with the reception of the signals by the selected aircraft.

43. The method of claim 39 including the computing of the aircraft position of each said aircraft during take off and landing relative to predetermined positions on a runway.

44. The method of claim 43 wherein said computing the aircraft position of each said aircraft during said take off and landing includes determining the position of each said aircraft relative to touch down and take off positions of the runway relative to an end of the runway and with respect to the central length axis of the runway during said respective landing and take off.

45. The method of claim 39 wherein said measuring includes generating at each aircraft and at each ground station a plurality of pulses each pulse having a time duration manifesting a predetermined distance and then counting the pulses manifesting each said transmission delay times.

46. The method of claim 45 including synchronizing the generation of said pulses and adjusting the time duration of said pulses to a substantially common value.

47. A method of determining the 3D position of all active aircraft in a given ATC area comprising independently computing on board each said aircraft the 3D position of all said aircraft in a given time period and selectively displaying the computed 3D positions including computing the aircraft position of each said aircraft during take off and landing relative to predetermined positions on a runway.

\* \* \* \* \*